United States Patent [19]
Weinberger et al.

[11] Patent Number: 5,680,129
[45] Date of Patent: Oct. 21, 1997

[54] SYSTEM AND METHOD FOR LOSSLESS IMAGE COMPRESSION

[75] Inventors: Marcelo Weinberger, San Jose; Gadiel Seroussi, Cupertino; Guillermo Sapiro, Los Altos, all of Calif.

[73] Assignee: Hewlett-Packard Company, Palo Alto, Calif.

[21] Appl. No.: 503,792

[22] Filed: Jul. 18, 1995

[51] Int. Cl.$^6$ .................................................. H03M 7/30
[52] U.S. Cl. ........................................................ 341/65
[58] Field of Search ............................ 341/65, 59, 51, 341/106

[56] References Cited

U.S. PATENT DOCUMENTS

| | | | |
|---|---|---|---|
| 4,420,771 | 12/1983 | Pirsch | 358/261 |
| 4,542,411 | 9/1985 | Imanaka et al. | 358/260 |
| 4,725,885 | 2/1988 | Gonzales et al. | 358/135 |
| 5,287,200 | 2/1994 | Sullivan et al. | 358/433 |

FOREIGN PATENT DOCUMENTS

| | | | |
|---|---|---|---|
| 0 245 621 | 11/1987 | European Pat. Off. | H04N 1/417 |
| 0 536 801 A2 | 4/1993 | European Pat. Off. | G06F 15/64 |

OTHER PUBLICATIONS

Lienard, Jean, "Real-Time Distortionless High-Factor Compression Scheme", Medical Physics, vol. 16, No. 6, Nov. 1989, pp. 845-850.

Tisher, P. E., et al., "Context-Based Lossless Image Compression", The Computer Journal, vol. 36, No. 1, 1993, pp. 68-77.

Martuci, Stephen, "Reversible Compression of HDTV Images Using Median Adaptive Predication and Arithmetic Coding", 1990 IEEE International Symposium on Circuits and Systems, vol. 2/4, May 1-3, 1990, pp. 1311-1313.

Howard, Paul G. et al., "Fast Progressive Lossless Image Compression", SPIE, Image and Video Compression, Feb. 9-10, 1994, vol. 2186, pp. 98-109.

Jiang, W.W. et al., "Lossless Compression for Medical Imaging Systems Using Linear/Non-Linear Prediction and Arithmetic Coding", 1993 IEEE International Symposium on Circuits and Systems, vol. 1/4, May 3-6, 1993, pp. 283-286.

*Primary Examiner*—Brian K. Young
*Attorney, Agent, or Firm*—Pehr Jansson

[57] ABSTRACT

A lossless image compression encoder/decoder system having a context determination circuit and a code table generator. The image compressor uses the context of a pixel to be encoded to predict the value of the pixel and determines a prediction error. The image compressor contains a context quantizer that quantizes the context of pixels. The image compressor counts the error values for each quantized context and uses these counts to generate context-specific coding tables for each quantized context. As it encodes a particular pixel, the encoder looks up the prediction error in the context-specific coding table for the context of the pixel and encodes that value. To decompress an image, the decompressor determines and quantizes the context of each pixel being decoded. The decompressor uses the same pixels as the compressor to determine the context. The decompressor retrieves from the context-specific coding table the error value corresponding to the coded pixel. The decompressor uses a predictor to predict the value of the pixel based on the context and adds the error value to determine the actual value of the pixel. In one embodiment the image compressor uses an alphabet extension, embedded in its context model, in specific low gradient contexts to reduce the redundancy of the encoding.

Other systems and methods are disclosed.

46 Claims, 15 Drawing Sheets

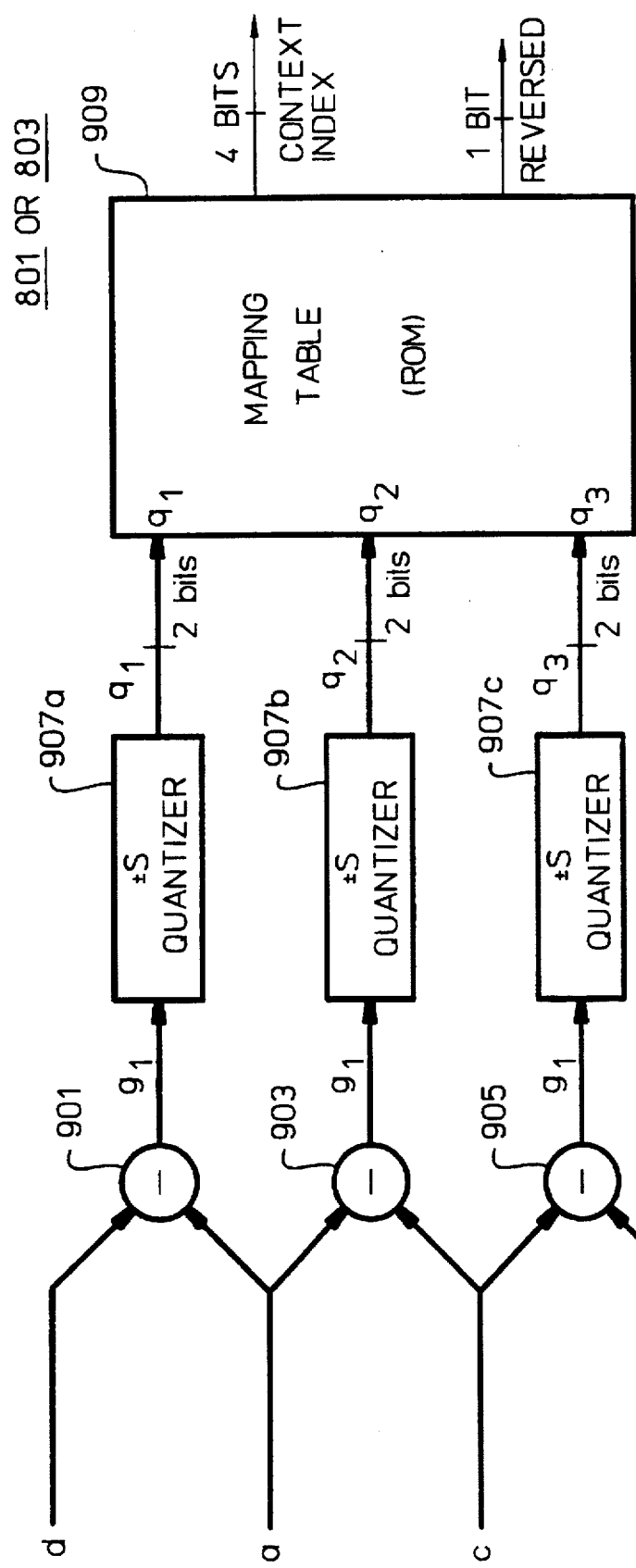
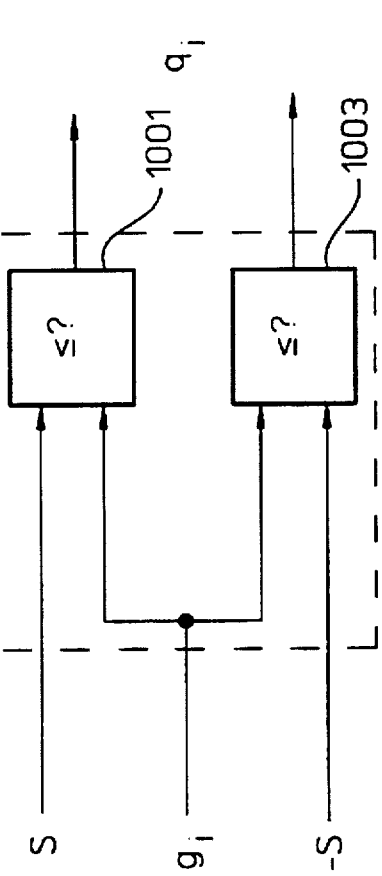
FIG. 9
FIG. 10

SYSTEM AND METHOD FOR LOSSLESS IMAGE COMPRESSION

TECHNICAL FIELD OF THE INVENTION

The invention relates generally to image compression, and, more particularly, to low complexity lossless and near-lossless compression having context-specific Huffman codes.

BACKGROUND ART

The use of compression algorithms for efficient data storage and communication has become a key component in most digital imaging systems. In many applications a reduction in the amount of resources required to store or transmit data is crucial, so that compression can be viewed as an enabling technology. Image compression algorithms are broadly classified into lossy (irreversible) schemes, for which the original pixel intensities cannot be perfectly recovered from the encoded bit stream, and lossless (reversible) schemes, for which the coding algorithms yield decompressed images identical to the original digitized images. The latter, in general, are required in applications where the pictures are subjected to further processing, e.g. for the purpose of extraction of specific information. Most lossy compression techniques are designed for the human visual system and may destroy some of the information required during processing. Thus, images from digital radiology in medicine or from satellites in space are usually compressed by reversible methods. Lossless compression is generally the choice also for images obtained at great cost, for which it may be unwise to discard any information that later may be found to be necessary, or in applications where the desired quality of the rendered image is unknown at the time of acquisition, as may be the case in digital photography. In addition, lossless may be preferred over lossy in applications where intensive editing or repeated compression/decompression are required: the accumulation of error due to a lossy iteration may become unacceptable.

Gray-scale images are considered as two-dimensional arrays of intensity values, digitized to some number of bits. In most applications 8 bits are used, although 12 bits is customary in digital radiology. Color images, in turn, are usually represented in some color space (e.g., RGB, YUV, LAB), in which each component is a gray-scale image. Thus, the tools employed in the compression of color images are derived from those developed for gray-scale images and our discussions will generally focus on the latter. It should be noted though that the combination of these tools in the case of color should take into account the possible correlation between color planes (e.g., in an RGB representation). Lossless image compression techniques often consist of two distinct and independent components: modeling and coding. The modeling part can be formulated as an inductive inference problem, in which an image is observed pixel by pixel in some pre-defined order (e.g., raster-scan). At each time instant i, and after having scanned past data $x^i = x_1 x_2, \cdots x_i$, one wishes to make inferences on the next pixel value $x_{i+1}$ by assigning a conditional probability distribution to it. (Notice that pixel values are indexed with only one subscript, despite corresponding to a two-dimensional array. This subscript denotes the "time" index in the pre-defined order.) In a sequential formulation, this distribution $p(\cdot|x^i)$ is learned from the past, and the goal in the long run is to maximize the probability assigned to the entire sequence $$P(x^n) = \prod_{i=1}^{n-1} p(x_{i+1}|x^i) \quad (1)$$

where $x^0$ denotes the empty string. In the coding part of the scheme, this probability assignment could be used sequentially by an arithmetic coder to obtain a total code length of $\lceil -\log P(x^n) \rceil$ bits (hereafter, logarithms are taken to the base 2). Arithmetic coding is described in J. Rissanen and G. G. Langdon, Jr., "Universal modeling and coding," *IEEE Trans. Inform. Theory*, vol. IT-27, pp. 12–23, January 1981. Since the conditional probability used to encode $x_{i+1}$ depends only on $x^i$, it is available to the decoder as it decodes the past string sequentially. Alternatively, in a two-pass scheme the conditional distribution can be learned from the whole image in a first pass and and some description of it must be sent to the decoder as header information. In this case, the total code length includes the length of the header. Yet, both the second encoding pass and the (single-pass) decoding are subject to the same sequential formulation.

In state-of-the-art lossless image compression schemes, the probability assignment is generally broken into the following components:

a. A prediction step, in which a deterministic value $\hat{x}_{i+1}$ is guessed for the next pixel $x_{i+1}$ based on a substring $x_{i_1} x_{i_2}, \cdots x_{i_v}$, of the available past sequence $x^i$, where v denotes the order of the predictor.

b. The determination of a context on which $x_{i+1}$ occurs. Again, this context is a function of a past subsequence $x_{i_1} x_{i_2}, \cdots x_{i_m}$ for some integer m.

c. A probabilistic model for the prediction residual (or error signal) $e_{i+1} = x_{i+1} - \hat{x}_{i+1}$, conditioned on the context of $x_{i+1}$.

FIG. 1 is a block diagram of a typical lossless image compression scheme. The shaded areas 101 and 101' represent the scanned past sequence $x^i$, on which prediction and context modeling are based, while the black dots 103 and 103' represent the pixel location currently encoded. An image 105 is input to a modeler 107. Inside the modeler 107, the image is input to a predictor 109. Based on the sequence 101 that precedes the pixel 103 a predicted value for the pixel 103 is guessed, $\hat{x}_{i+1}$. This predicted value is subtracted from the actual value to obtain the error value $(e_{i+1} = x_{i+1} - \hat{x}_{i+1})$. The errors are then modeled in an error modeler 109. The probability distribution of the error values and the error values for individual pixels are fed to a coder 111 to produce an output compressed bitstream 113.

The best available published compression ratios correspond to the scheme discussed in M. J. Weinberger, J. Rissanen, and R. Arps, "Applications of universal context modeling to lossless compression of gray-scale images," Submitted for publication in *IEEE Trans. Image Processing*, which is inspired on the ideas of universal modeling, as reported in the comparative tables of results in Weinberger et al. In that method, the context for $x_{i+1}$ is built out of dynamically varying quantized versions of the differences $x_{ij} - x_{il}$, where $x_{ij}$ and $x_{il}$ are the values of two adjacent pixels within a fixed causal template (with respect to the scanned direction) which is used as the maximum search space for the context within $x^i$. The degree of quantization is determined dynamically with a complex calculation based on an intricate database of symbol occurrence counts. The variable sizes of the conditioning contexts are optimized based on the concept of stochastic complexity in order to prevent "over-fitting" the model. In principle, larger contexts better capture the inherent "structure" of the data, as they imply more skewed distributions for the prediction residuals, which results in a better fit.

However, choosing a model whose complexity is unnecessarily large (i.e., a model for which the same fit can be achieved with smaller contexts and, hence, with fewer parameters) negatively affects performance. These redundant parameters imply a "model cost," which in a sequential scheme can be interpreted as capturing the penalties of "context dilution" occurring when count statistics must be spread over too many contexts, thus affecting the accuracy of the corresponding estimates. In non-sequential (two-pass) schemes the model cost represents the code length required to encode the model parameters estimated in the first pass, which must be transmitted to the decoder. The prediction step in Weinberger et al. is accomplished with an optimized, context-dependent linear predictor, and the modeled prediction residuals are arithmetic encoded. The resulting code length is provably asymptotically optimal in a certain broad class of processes used to model the data.

Both the modeling and coding part of the scheme of Weinberger et al. are of high complexity, due to the complex underlying data structure used for prediction and context modeling, and the required arithmetic coder. Some alternatives exist which use a fixed predictor and a non-optimized context model for the prediction residuals, with only moderate deterioration in the compression ratios obtained for some types of images (especially natural landscapes and portraits; the deterioration is more significant for medical and satellite images). One such technique is the version of the Sunset algorithm which forms the basis for the JPEG compression standard. This technique is described in U.S. Pat. No. 4,749,983 to Langdon, entitled "Compression of Multilevel Signals."

However, the model used in these algorithms still requires arithmetic coding of prediction residuals, an operation that is considered too complex in many applications, especially in software applications and in the very frequent case in which decoding speed is crucial. Other alternatives have been designed with simplicity in mind and propose minor variations of traditional DPCM techniques (a discussion of the DPCM technique may be found in A. Netravali and J. O. Limb, "Picture coding: A review," *Proc. IEEE*, vol. 68, pp. 366–406, 1980), which include Huffman coding of prediction residuals obtained with some fixed predictor. Thus, these techniques are fundamentally limited in their compression performance by the first order entropy of the prediction residuals. Their ability to "decorrelate" the data is reduced to the prediction step, which in general cannot achieve total decorrelation.

Ideally, the prediction of the value of the current pixel $x_{i+1}$ based on its surrounding pixels that have already been processed should be done by adaptively learning a model conditioned on the local edge direction, as discussed in Weinberger et al. However, such adaptive learning is exceedingly complex.

Nevertheless, a low-complexity edge detector is desirable in order to approach the best possible predictors.

The seven fixed linear predictors proposed for the lossless JPEG scheme (as described in ISO/IEC 10918-1 ITU T.81. Digital compression and coding of continuous tone still images—Requirements and guidelines, September 1993), not only discards edge information that might be available in the causal template, but produces very different compression results depending on the selected predictor. Moreover, the best predictor depends heavily on the image.

Accordingly, it is desirable to have an image compressor that uses low-complexity predictors with some degree of edge detection.

The term "low-complexity" herein connotes an image compression system which uses predictors based on additions and shift operations, which avoids floating point arithmetics and general multiplications. It also implies a context determination process with simple comparisons, fixed table look-ups, and no updating of complex underlying data structures. None of the above mentioned image compression schemes based on context models achieve "low-complexity" as defined herein.

Although optimal as a prefix code, a Huffman code may be far from being matched to the distribution from which it was generated, if this distribution is very skewed. At least a one-bit code word needs to be assigned to every event, so that the average per-symbol code length cannot approach the entropy of the distribution whenever one event concentrates more than half of the probability mass. This is exactly the case in contexts representing smooth regions, for which a prediction error value of 0 is extremely likely. For some images, the redundancy of the corresponding Huffman code would produce a significant deterioration of the compression ratio. In traditional (non-conditioned) Huffman codes, this problem is addressed through an alphabet extension in which blocks of data is encoded as "super-symbols." This type of alphabet extension can be viewed as a means of spreading the excess code length of the Huffman code over many symbols, thus reducing the per-symbol redundancy.

It would therefore be desirable to achieve the simplicity of Huffman coding with the modeling power of context conditioning while still being able to maintain skewed distributions and a per-symbol code that approaches the entropy of the distribution.

SUMMARY OF THE INVENTION

It is an object of the invention to provide a low-complexity image compressor that achieves the compression ratios of complex image compressor systems.

It is an object of the invention to provide a image compressor that combines the benefits of Huffman coding with contextual modeling.

It is a further object of the invention to provide an image compressor that uses a low-complexity predictor that is sensitive to edges.

It is an object of the invention to use local gradients to determine the context of a pixel to be compressed.

It is an additional object of the invention to quantize the context of a pixel to be compressed and use the quantized contexts to create and select look-up tables for prediction residuals.

It is another object of the invention to overcome the minimum of one-bit per pixel limitation of Huffman coding.

The above and other objects of the invention are satisfied by providing an image compressor that has a context quantizer, a predictor, and a table generator that builds Huffman tables based on the probability distribution of errors for quantized contexts. The context is determined by the pixels in a template that includes previously encoded pixels. The context quantizer determines a quantized context of a pixel to be codified. The image processor uses the context of a pixel to be compressed to predict the value of the pixel. The image compressor compares the predicted values of each pixel with the corresponding actual value. The errors are counted with respect to the particular quantized context to which the pixel belongs. At the conclusion of a first pass, the image compressor has probability distributions for the errors encountered with each quantized context. The image compressor uses these probability distributions to create context-specific Huffman tables.

In a second pass the image compressor uses the quantized context of a pixel to be coded to look up in the Huffman table that corresponds to the quantized context the code corresponding to prediction error for the pixel. In one embodiment the image compressor uses an alphabet extension, embedded in its context model, in specific low gradient contexts to reduce the redundancy of the encoding.

On the decompression side, the decompressor also has a predictor and a context quantizer. The decompressor determines the context of a pixel to be decoded by looking to the same context template as the one used by the image compressor. The context quantizer then determines which Huffman table in which to look up the error value corresponding to the encoded pixel. The decompressor obtains a predicted value for the pixel, using previously decoded pixels in the context template, and adds the error value to the predicted value to obtain the actual pixel value.

Still other objects and advantages of the present invention will become readily apparent to those skilled in this art from the detailed description, wherein we have shown and described the preferred embodiments of the invention, simply byway of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The invention is best understood by referring to the drawings accompanying this specification in which like numerals represent like elements. As a convention, elements bearing a reference numeral followed by a single or multiple apostrophes is an identical element or similar to, but a variation of, the element bearing the numeral without an apostrophe and any other elements with the same reference numeral but having a different number of apostrophes.

FIG. 9 is a schematic of a gradient quantizer of the context determination circuit of FIG. 8.

FIG. 10 is a logic diagram of quantizer for one gradient of the gradient quantizer of FIG. 9.

DETAILED DESCRIPTION OF THE DRAWINGS

The present invention is a system and method for lossless compression of continuous-tone images that combines the simplicity of Huffman coding with the compression potential of context models. The compressor of the present invention is based on a fixed context model, but is tuned for efficient performance in conjunction with a collection of context-conditioned Huffman codes. The use of Huffman coding in conjunction with context-conditioning poses unique problems which are solved by the present invention. On one hand, the number of possible error events (the effective alphabet at each context) cannot be too large, as a different Huffman table needs to be designed for each context. For the same reason, the number of contexts must be relatively small. On the other hand, the alphabet cannot be too small, for otherwise the redundancy of Huffman codes (i.e., the excess code length over the entropy) increases. This redundancy vanishes only for distributions in which each probability is a negative power of two. An additional fundamental limitation of Huffman codes is that they require a minimum code length of one bit per encoding, which may produce a significant deterioration in the compression ratio for contexts with very skewed distributions.

By addressing and finding a solution to the above problems, the present invention attains, at low complexity, compression ratios similar or superior to those obtained with more complex codes based on arithmetic coding, e.g., the family of Sunset coders. In particular, as discussed below, the present invention proves to have superior compression performance than the JPEG independent lossless compression system at a lower level of complexity.

Figure 1:
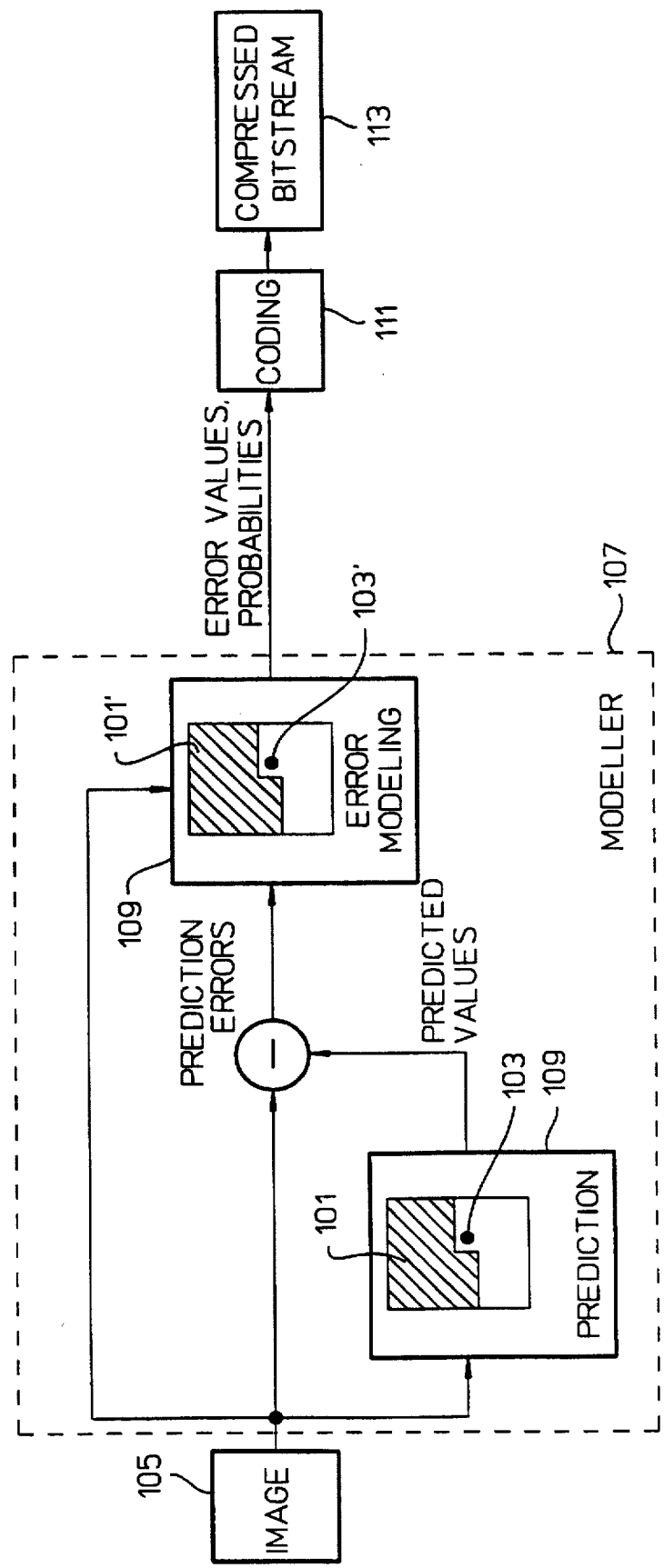
FIG. 1 is a block diagram of a typical lossless image compression scheme.
Figure 2:
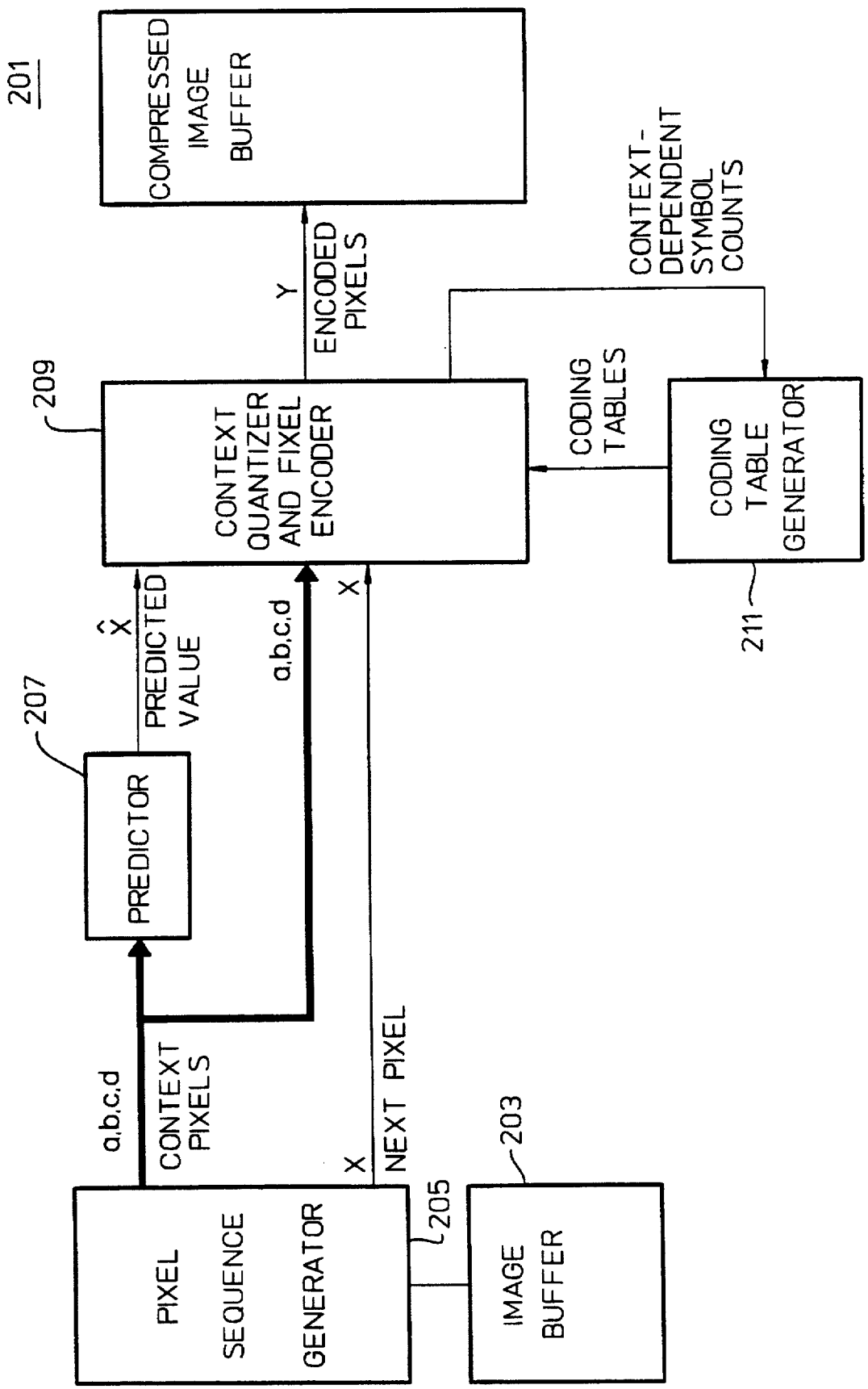
FIG. 2 is a block diagram of an image compressor system according to a preferred embodiment of the present invention.

FIG. 2 is a block diagram of an image compressor system 201 according to a preferred embodiment of the present invention. Uncompressed images are stored in an image buffer 203. The image buffer is connected to a pixel sequence generator 205. The pixel sequence generator 205 is connected to a predictor 207 and to a context quantizer and pixel encoder 209. The predictor 207 operates to determine a predicted value for the pixel currently being processed, using its context. The total number of possible contexts can be quite large. The context quantizer 209 operates to classify a particular context as being one in a set of quantized contexts.

In one embodiment, the image compressor 201 operates as a two-pass system. In the first pass the image compressor 201 counts the number of occurrences of each error value for each quantized context. At the conclusion of the first pass, the image compressor 201 has produced probability distributions for the prediction residuals for each quantized context. These context-dependent counts of prediction residuals are input to a coding table generator 211, which builds Huffman tables based on the probability distributions of the prediction residuals.

During the second pass, the image compressor system 201, via the context quantizer/pixel encoder 209 uses the context-specific Huffman tables to encode the prediction residuals for each individual pixel in the image being compressed. The encoded image may then be decoded by an image decoder, such as the one shown in the block diagram of FIG. 12.

Figure 3:
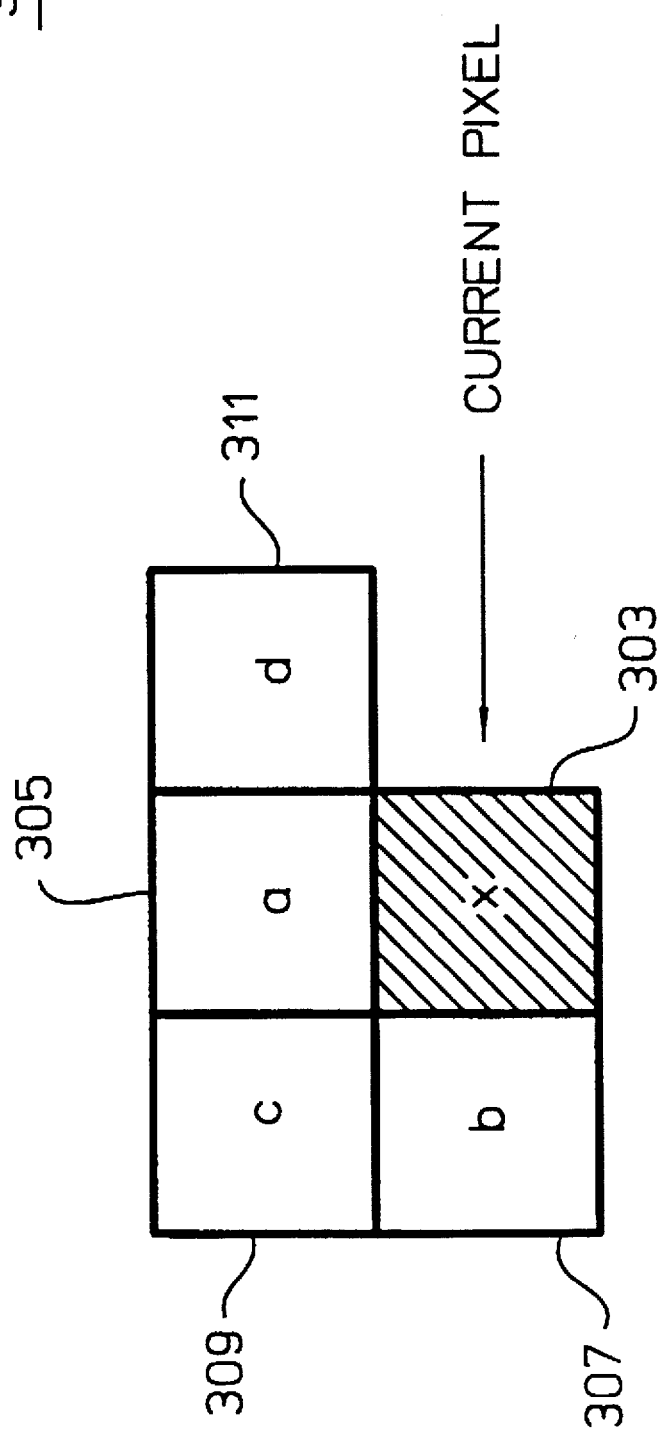
FIG. 3 is a graphic depiction of a causal template used by the present invention.

The pixel sequence generator 205 outputs a number of context pixels to the predictor 207. FIG. 3 is a graphic depiction of a causal template 301 used by the present invention. Element 303, a pixel having the value x, is the pixel currently being processed. In the template 301, the value of the "North" pixel 305 (the pixel above the current pixel 301) is denoted by a, the value of the "West" pixel 307 (the pixel on the left) is denoted by b, while the values of the "NW" (pixel 309) and "NE" (pixel 311) pixels (the pixels on the diagonals) are denoted by c and d, respectively. The "East" pixel is not used, because it is unavailable to the decoder as it decodes the code string sequentially. Of course, a, b, c, and d depend on the time index i, but this dependence has been deleted from the notation for simplicity.

Prediction

The predictor 207 of the image compression system 201 employs a simple test to detect vertical or horizontal edges. If an edge is not detected, then the guessed value is a+b−c, as this would be the value of $x_{i+1}$ if a plane passes through the N, W, and NW pixel locations, with respective heights a, b, and c, and the current pixel is constrained to belong to the same plane. This constraint expresses the fact that the image is expected to be smooth in the absence of edges. Specifically, the predictor 207 guesses:

$$\hat{x}_{i+1} \equiv \begin{cases} \min(a,b) & \text{if } c \geq \max(a,b) \\ \max(a,b) & \text{if } c \leq \min(a,b) \\ a+b-c & \text{otherwise} \end{cases} \quad (2)$$

Assuming, without loss of generality, that a≤b, then the predictor of (2) can be interpreted as picking a in many cases where a vertical edge exists left of the current location, b in many cases of an horizontal edge above the current location, or a plane predictor (i.e., smoothness is assumed) if no edge has been detected.

In an alternative embodiment d is used by the predictor 209. By utilizing d the predictor 209 better identifies edges. In this embodiment, the predictor 209 obtains first-order entropy of prediction errors which are smaller than when using equation (2). This predictor can be expressed as $$\tilde{x}_{i+1} \equiv \begin{cases} \max(a',b) & \text{if } a+b-c \geq \max(a',b) \\ \min(a',b) & \text{if } a+b-c \leq \min(a',b) \\ a+b-c & \text{otherwise} \end{cases} \quad (3)$$

Figure 4A:
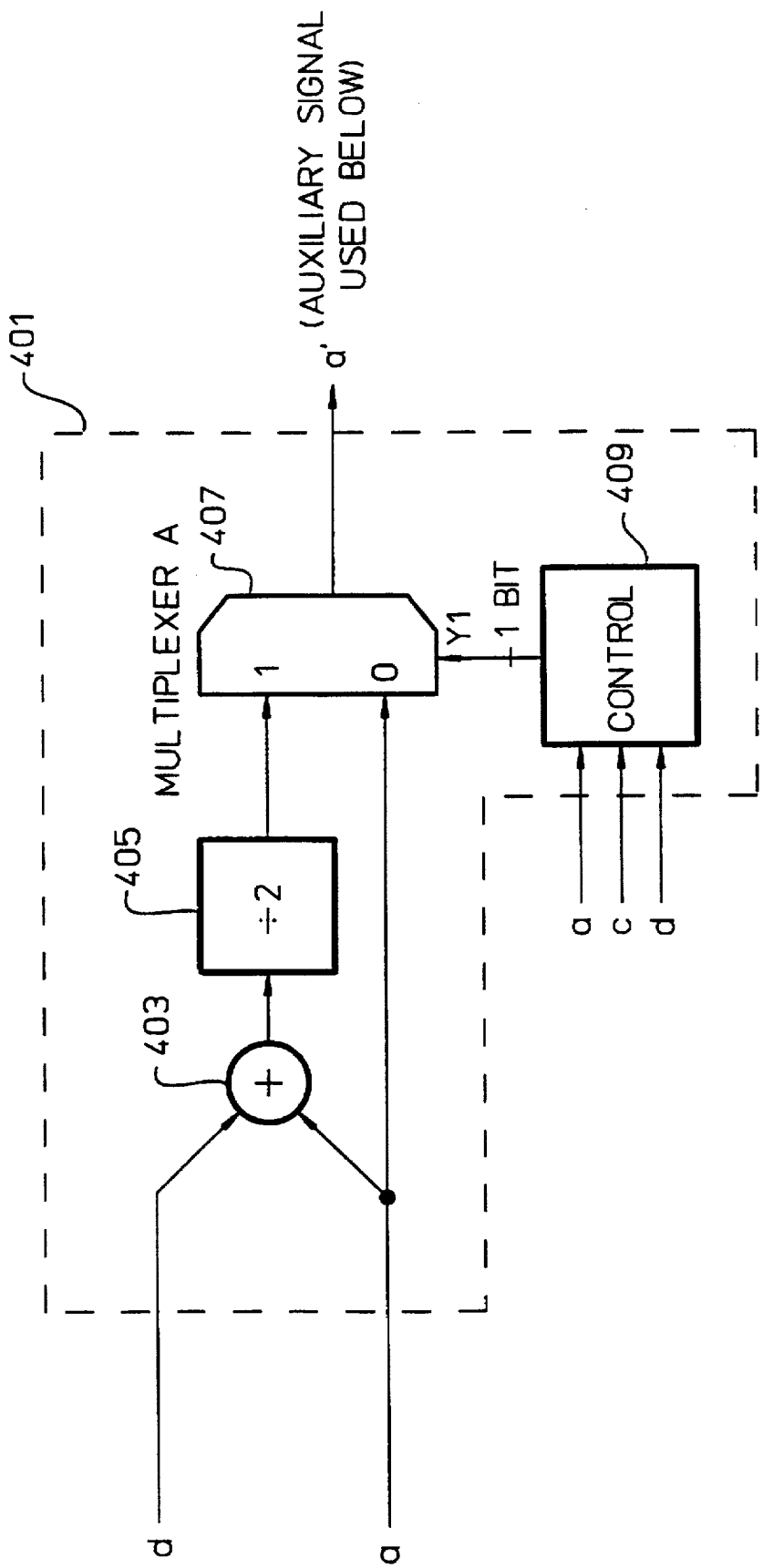
FIG. 4 is a schematic diagram of a predictor according to the present invention.
Figure 4B:
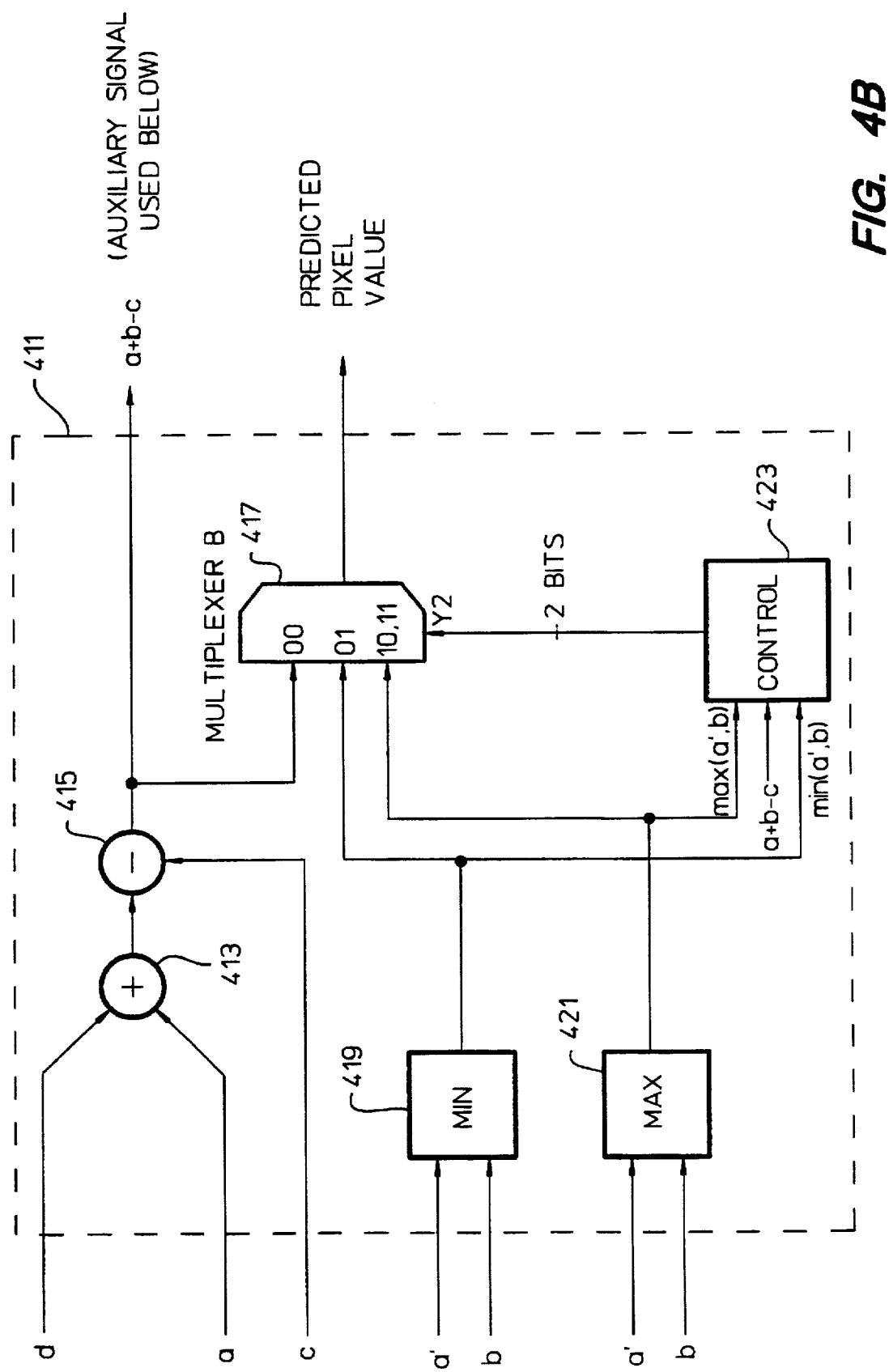

FIG. 4 is a schematic diagram of the predictor 207 using the equations (3) and (4). A circuit 401 produces the auxiliary signal a. The circuit 401 accepts the a and d input values. These values are added by an adder 403, and divided in two by a shift register 405. The resulting output is multiplexed with the value a by multiplexer 407. The control signal Y1 for the multiplexer is produced by a controller 409. If the control signal Y1 is 1, the output from shift register 405 is output as the auxiliary signal a', otherwise the value a is output as auxiliary signal a'.

Figure 5:
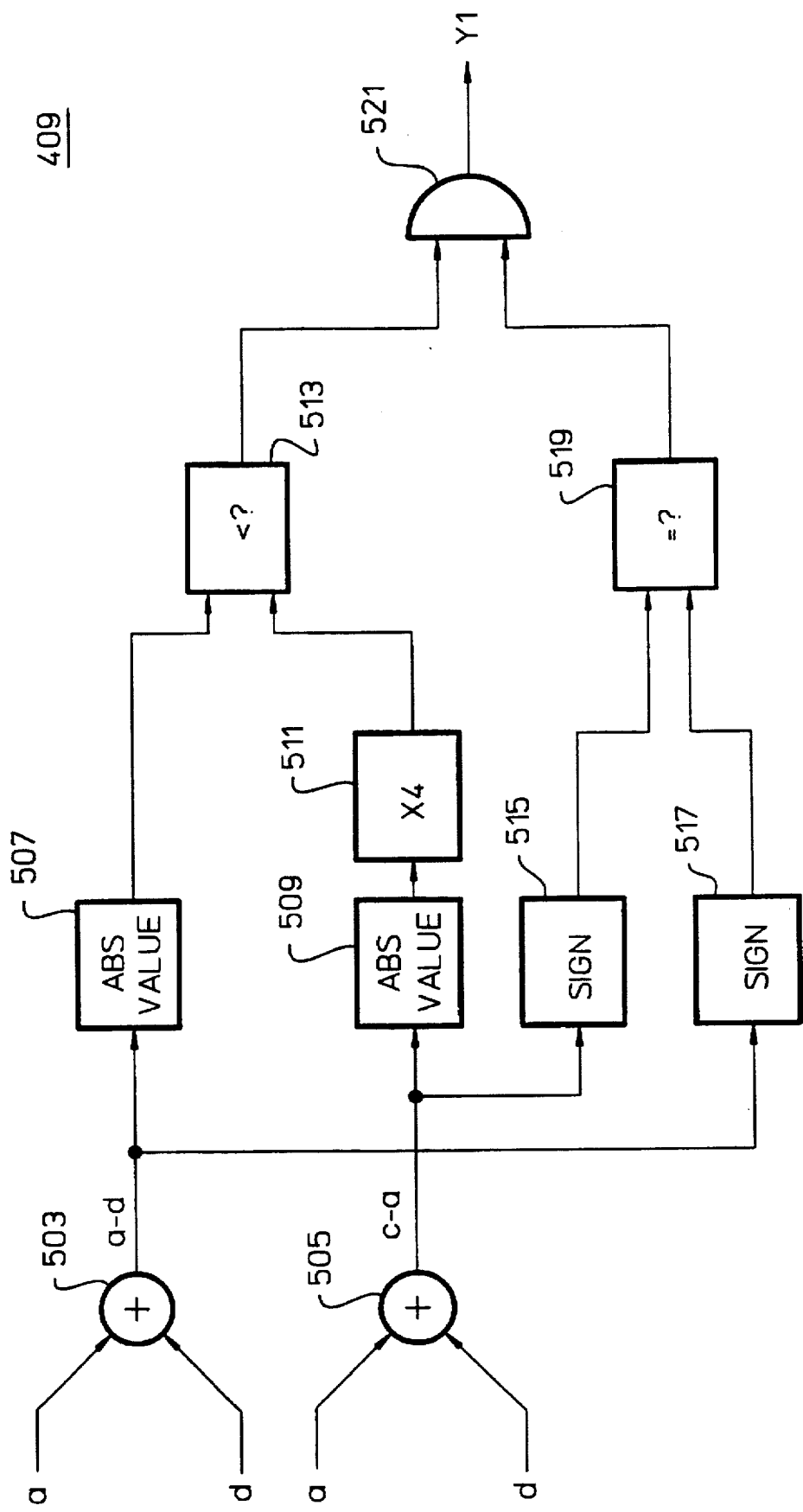
FIG. 5 is a schematic diagram of a control circuit producing a control signal used by the predictor of FIG. 4.

The control signal Y1 is produced by a control circuitry 501 shown schematically in FIG. 5. The control circuitry 501 accepts as input the values a, c, and d. The value d is subtracted from the value a by a subtractor 503. Similarly, the value a is subtracted from the value c by a subtractor 505. The resulting values are fed into absolute value units 507 and 509, respectively. The output from the absolute value unit 509 is fed into a shift register to be multiplied by 4. The output from the shift register 511 and the output from the absolute value unit 507 are both fed into a comparator 513. The output of comparator 513 is 1 if |a−d|<4|a−c| and 0 otherwise. To determine whether the signs are equal for the two terms a−d and c−a the sign bit of each subtractor 503 and 505 output is extracted 515 and 517 and these sign bits are compared by a comparator 519. The output of the comparator 519 is 1 if the two sign bits are equal and 0 otherwise. The outputs from the comparators 513 and 519 are ANDed by AND gate 521 to produce the control signal Y1.

Returning to FIG. 4. The circuitry 411 is connected to the circuitry 401 via signal a'. The circuitry 411 determines the predicted pixel value based on the context pixel values a, b, and c, and the value a'. The circuitry 411 calculates three alternative values representing the three alternatives of equation (3). The first alternative value is produced by adding values a and b by adder 413 and feeding the resulting sum and the value c to subtractor 415. The subtractor output is then fed as a first input into a multiplexer 417. The second and third alternative values are the minimum and maximum values of values a' and b. These are produced by units 419 and 421, respectively.

Figure 6:
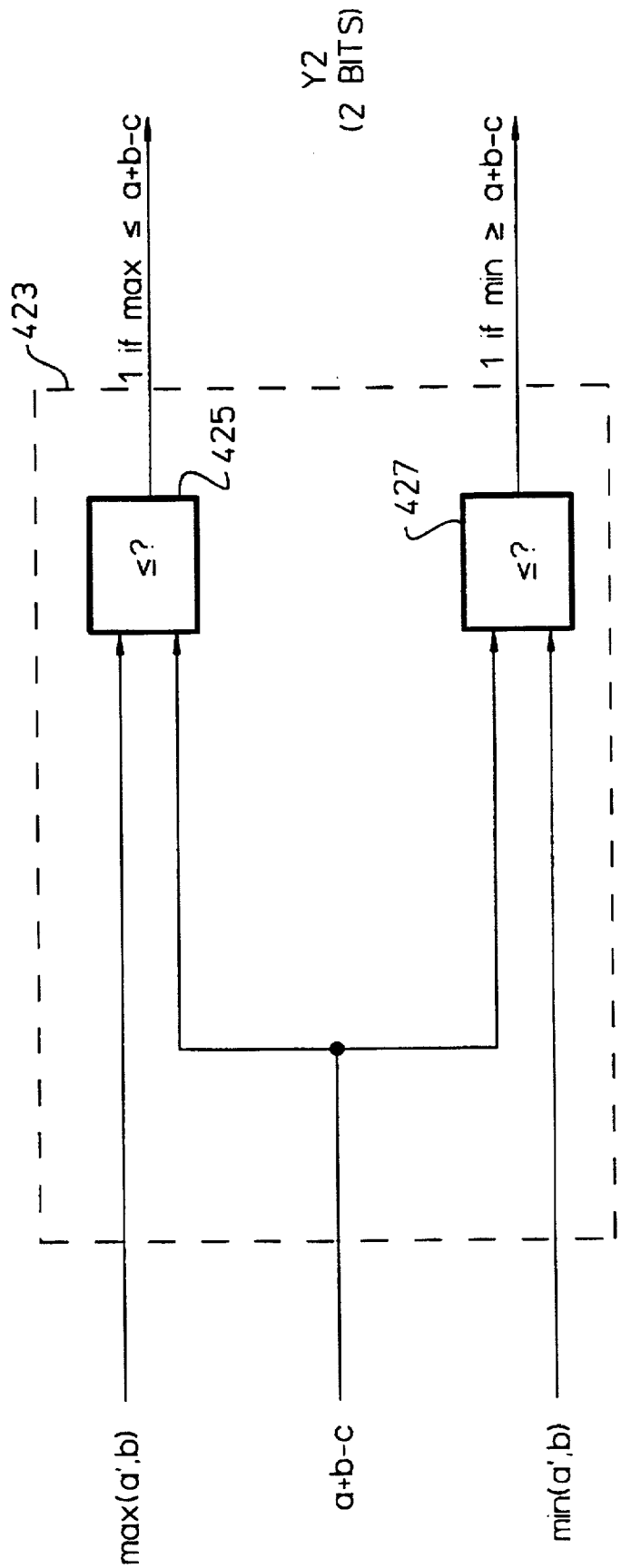
FIG. 6 is a schematic of a second control circuit producing a second control signal used by the predictor of FIG. 4.

The control signals Y2 for the multiplexer 417 are produced by a second control circuit 423. The inputs to the control circuit 423 are the minimum and maximum values of values a' and b, output from units 419 and 421, respectively, and the output from the subtractor 415. The control circuit 423 is shown in greater detail in FIG. 6. The control circuit 423 consists of two comparators 425 and 427. Each of the comparators is connected to the signal a+b−c, output from subtractor 415. The comparator 425 is connected to the max(a',b) signal and outputs a 0 if the result a+b−c is less than the maximum of a' and b, and outputs a 1, otherwise. The comparator 427 is connected to the min(a',b) signal and outputs a 0 if the result a+b−c is greater than the minimum of a' and b, and outputs a 1 otherwise The control signal Y2 is the combination of the outputs from the comparators 425 and 427.

If the control signal Y2 is 00, indicating that min(a',b) <a+b−c<max(a',b), the predicted pixel value is the result a+b−c. If Y2 is 01, indicating that a+b−c≤min(a',b), the predicted pixel value is the minimum of a' and b. Otherwise, Y2 is 10, indicating that a+b−c≥ max(a',b), and the predicted pixel value output by predictor 207 is the maximum of a' and b. If Y2=11, then a+b−c=min(a',b)=max (a',b), and any of the inputs can be selected, e.g., max(a'b).

Figure 7:
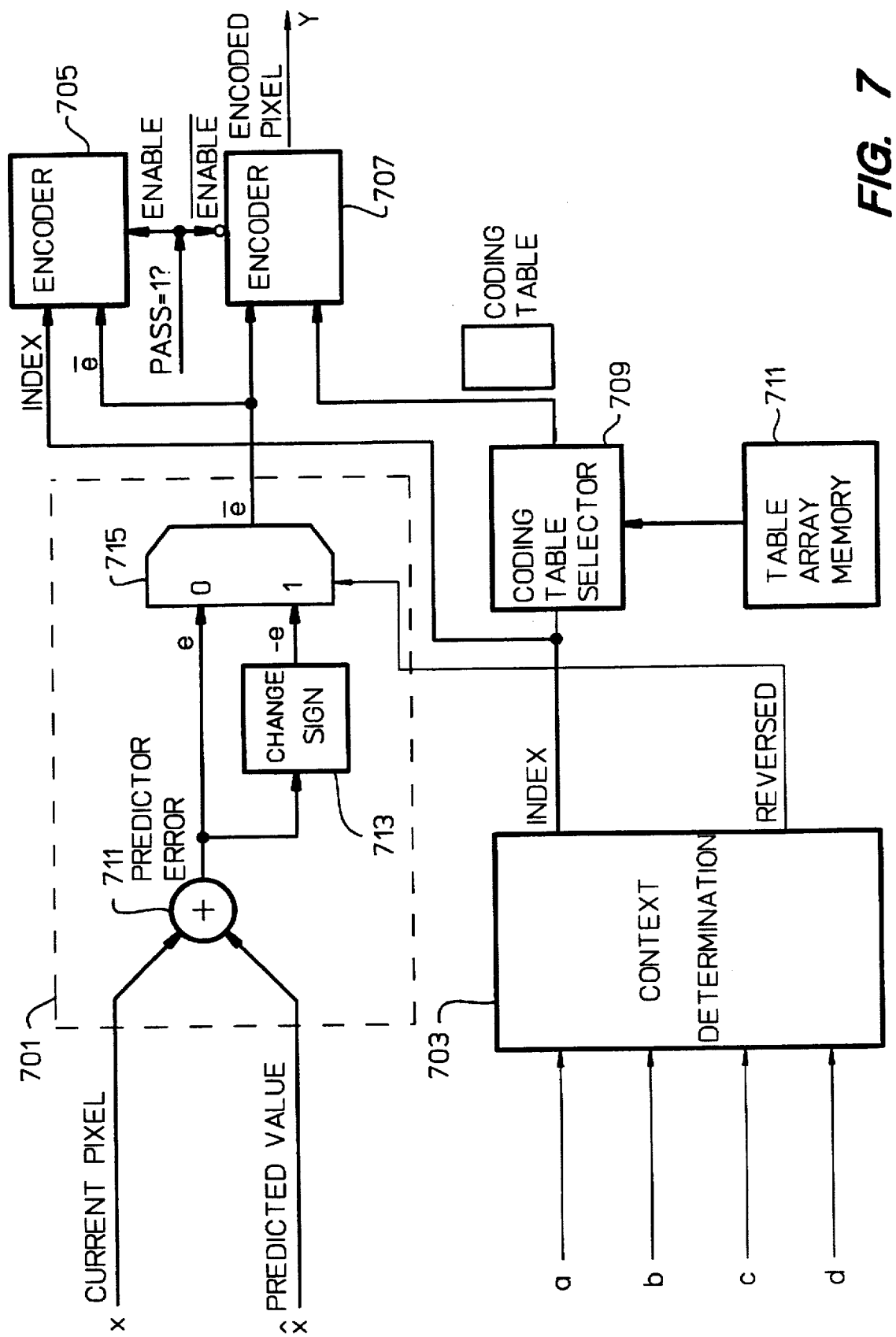
FIG. 7 is a block diagram of the context quantizer and pixel encoder of the image compressor system of FIG. 2.

FIG. 7 is a block diagram of the context quantizer and pixel encoder 209. The context quantizer/pixel encoder consists of five major units, namely, an error circuitry 701, a context determination circuitry 703, a context-indexed counter 705, an encoder 707, and a coding table selector 709. The current pixel and the predicted value (from the predictor 207) are input to a subtractor 711 of the error circuitry 701 to determine the prediction residual or prediction error. As is discussed below in conjunction with FIG. 9, depending on which quantized context the current pixel's context is a member of, either the error (e) or the opposite value of the error (−e) is encoded or counted. Therefore, the negative of e is produced by unit 713, and both values are fed into a multiplexer 715 to be selected by a control signal (reversed) from the context determination circuitry, which outputs the error quantity ē which is to be counted (by pass 1 of the image compressor 201) or encoded (during pass 2).

The error quantity ē is fed into both the context-indexed counter 705 and the encoder 707. These are enabled or disabled depending on which pass the image compressor 201 is operating by a pass signal.

Parameter Reduction:

Reducing the number of parameters is a key step in a context modeling scheme. In a sequential formulation, the goal is to avoid "context dilution," while in a two-pass scheme we wish to reduce unnecessary table overhead. The total number of parameters in the model depends on the number of different error events considered at each context, and on the number of contexts.

One method of the image compressor 201 is Alphabet reduction. Let A denote the total number of different pixel intensities, which is assumed to be a power of two (e.g.,A= 256 for 8-bit pixels). In principle, the error residuals may take on values in the range [−A+1,A−1]. However, given the predicted value, only A residuals within this range can occur, and it is easy to see that the decoder only needs ($e_{i+1}$ mod A) to recover $x_{i+1}$. This modular reduction amounts, in a 2's complement representation, to just ignoring any carry to the log A +1st bit. Thus, the image compressor 201 makes use of the fact that prediction residuals are integers between −A/2 and A/2−1, represented with log A bits.

Assuming that the predictor indeed makes reasonable guesses, the distribution of prediction residuals is usually skewed, peaked at 0, and decaying rapidly for large prediction residual magnitudes. Thus, it is unwise to build Huffman codes for the entire set of A possible error events (one code for each context), as most of these events are expected to occur with very low probability. Instead, the image compressor 201 considers the following possible events for the error value $e_{i+1}$:

$$\text{"less than } (-T)\text{"}, -T, -T+1, \ldots, -1, 0, +1, \ldots, T-1, T, \text{"greater than T"} \quad (5)$$

where T is a threshold parameter used to tune the image compressor 201. For A=256, T=8 proves to be a good empirical choice, thus leading to 19 possible error events per context. Of course, if $|e_{i+1}|$ happens to be larger than T, the decompressor system still needs to be informed of the exact absolute value of the prediction residual (the sign is already given by the "smaller than (−T)" and "greater than T," events). Because this is an unlikely event, an image compressor 201 according to the present invention saves "parameter resources" by encoding all the occurrences of large prediction residuals using a single distribution, regardless of the context at which the events "$e_{i+1}<-T$," or "$e_{i+1}>T$," are encoded.

After a prediction residual is identified to be large, A/2−T possible values (representing the absolute value of the error) need to be assigned code words, with the encoder 707 in a "large error" state. Again, very large residuals are extremely unlikely, so the present image compressor 201 uses a further reduction of the corresponding Huffman table, which consists of the values:

$$T+1, T+2, \ldots, B, \geq B+1, \quad (6)$$

where B is a parameter. For A=256, B=64 is a good empirical choice.

If an error residual happens to be at least B+1, then the corresponding Huffman code word is followed by the binary representation of the value (|e|−B−1) to $\lceil \log (A/2-B) \rceil$ bits (e.g., 6 bits for A=256) to indicate the exact error value.

By (5) and (6), the image compressor 201 requires a (2T+3)-entry Huffman table (typically, 19 entries) per context, together with a single (B−T+1)-entry Huffman table (typically, 57 entries for A=256). As is discussed below, two other types of Huffman tables (resulting from extending the reduced alphabet) are also used. These Huffman tables are stored in a table array memory 711.

The context that conditions the encoding of the current prediction residual in the image compressor 201 according to the present invention is built out of the differences $g_1=d-a$, $g_2=a-c$, and $g_3=c-b$. Intuitively, these differences represent the local gradient, which governs the statistical behavior of prediction errors. By symmetry, the three difference values influence the model in the same way. In the image compressor 201, parameter reduction is obtained by quantizing each difference into approximately equiprobable regions. In a well-defined mathematical sense, this maximizes the mutual information between the current pixel and its context, an information theoretic measure of the amount of information provided by the conditioning context on the pixel value to be modeled.

According to the present invention, low complexity of the image compressor is achieved by quantizing the context based on a fixed number of "equiprobable" regions. By symmetry, there is one region centered at the difference value 0, and if the interval $[r_1, r_2]$ represents a region, then so does $[-r_1, -r_2]$. Thus, the total number of regions is an odd integer 2R+1 and, in principle, this would lead to a total of $(2R+1)^3$ different contexts, where R is a parameter that controls the number of quantization regions. However, again by symmetry, it is reasonable to assume that $$\text{Prob } \{e_{i+1}=D|C_i=[q_1, q_2, q_3]\}=\text{Prob } \{e_{i+1}=-D|C_i=[-q_1, -q_2, -q_3]\} \quad (7)$$

where $C_i$ represents the context triplet at time i and $q_j$, j=1,2,3, are quantized differences corresponding, respectively, to $g_j$, j=1, 2, 3 (parenthesis are used herein to denote the triplet of gradients $(g_1, g_2, g_3)$ and square brackets to denote its quantized counterpart $[q_1, q_2, q_3]$). Using this equality, the image compressor 201 reduces the number of contexts to $((2R+1)^3-1)/2+1$. In a preferred embodiment the image compressor 201 uses R=1, which results in 14 different contexts.

Each quantized context is represented by a three-dimensional vector $[q_1, q_2, q_3]$. For each non-zero vector, there is a vector with the same magnitude but exactly opposite orientation. The contexts represented by these opposing vectors are considered a quantized-context pair, and in one embodiment of the image compressor 201, only one Huffman table is generated for each pair. Notice that, by merging symmetric contexts, the encoded value may actually be the opposite of the prediction residual. For example, with R=1, let (−1), 0, and (+1) denote the three context regions (denoting "negative," "around zero," and "positive," respectively). If a residual of, say, 4 is encoded as such at context [−1, +1, 0], then a residual of, say, 3 at context [+1, −1, 0], is actually encoded as a (−3), with the same tables as the former.

To complete the definition of the contexts in an embodiment of the image compressor 201 with R=1, a parameter S specifies the value that determines the boundaries between quantization regions. The central region is formed by those difference values Δ such that −S<Δ<S. It turns out that the optimal value of S depends heavily on the image. For many images a reasonable choice is S=7. For some smoother images this selection will tend to concentrate most of the pixels in the central region (i.e., contexts like [0,0,0] or [0,0,+1]), while contexts like [−1,+1,+1] tend to be underpopulated. In the present invention, a solution to this problem is obtained by choosing a relatively large boundary value (e.g., S=7 as a default), and then subdividing the "central context" [0,0,0] by recursively applying the same scheme with the boundary parameter $\lfloor S/2 \rfloor$. Thus, the total number of contexts is augmented to $(2R+1)^3$ (namely, 27 in one preferred embodiment). As is discussed below, under-populated contexts may be encoded with a fixed code, thus saving unnecessary table overhead.

Figure 8:
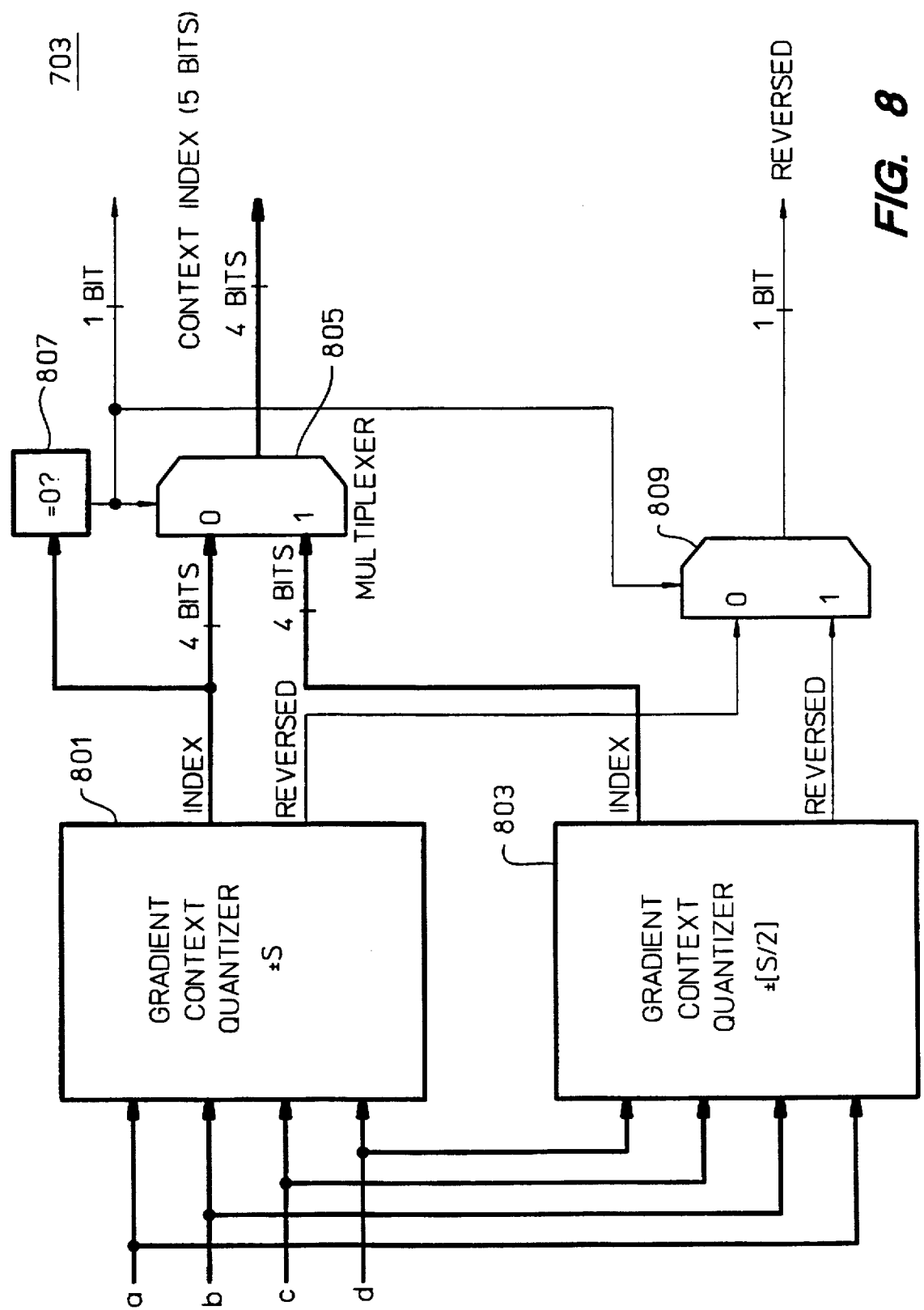
FIG. 8 is a high-level block diagram of the context determination circuit of FIG. 7.

FIG. 8 is a high-level block diagram of the quantizer 703 of FIG. 7. As discussed above, two levels of quantization are performed, one using S and one, for a central context [0,0,0] using $\lfloor S/2 \rfloor$. The former context quantization is performed by a gradient context quantizer 801 and the latter (the sub-quantization of the central context) is performed by a second gradient context quantizer 803. Internally the two quantizers 801 and 803 are identical and are shown in FIG. 9.

The three gradients, d–a ($g_1$), a–c ($g_2$), and c–b ($g_3$), are determined by subtractors 901, 903, and 905, respectively. These are each input to a "±S" quantizer 907 (907a, 907b, and 907c, respectively). Each of the "±S" quantizers 907 are internally identical and an exemplary "±S" quantizer 907 is shown in FIG. 10. The "±S" quantizers 907 input a gradient $g_i$ and the parameter S and its negative (–S). The "±S" quantizers 907 consist of two comparators 1001 and 1003, which operate to produce a two-bit output signal $q_i$, having a value "10" for $g_i \leq -S$, "00" for $-S < g_i < S$, and "01" for $S \leq g_i$ (these relationships correspond to –1, 0, and 1, respectively, for the value of $q_i$ in the preceding discussion). S is assumed positive, so the combination "11" is not possible.

Returning to FIG. 9, as discussed above, there is a symmetry between quantized contexts, and the image compressor according to the present invention capitalizes on that symmetry by only having one table for each pair of symmetric quantized contexts. Therefore, quantized context signals, $q_i$, are fed into a mapping table 909 which maps the quantized context with the appropriate Huffman table. As noted above, with R=1 there are 14 such tables. Thus, the context index output from the mapping table consists of four bits representing a number between 0 and 13. Additionally, there is a one-bit output, reversed, for indicating whether the index is for the "opposite" table.

Table 1 is an illustrative example of the mapping table 909:

TABLE 1

| Input | | | mapped to | | | index | rev |
|---|---|---|---|---|---|---|---|
| q1 | q2 | q3 | | | | | |
| 00 | 00 | 00 | 00 | 00 | 00 | 0000 | 0 |
| 00 | 00 | 01 | 00 | 00 | 01 | 0001 | 0 |
| 00 | 00 | 10 | 00 | 00 | 01 | 0001 | 1 |
| 00 | 01 | 00 | 00 | 01 | 00 | 0010 | 0 |
| 00 | 01 | 01 | 00 | 01 | 01 | 0011 | 0 |
| 00 | 01 | 10 | 00 | 01 | 10 | 0100 | 0 |
| 00 | 10 | 00 | 00 | 01 | 00 | 0010 | 1 |
| 00 | 10 | 01 | 00 | 01 | 10 | 0100 | 1 |
| 00 | 10 | 10 | 00 | 01 | 01 | 0011 | 1 |
| 01 | 00 | 00 | 01 | 00 | 00 | 0101 | 0 |
| 01 | 00 | 01 | 01 | 00 | 01 | 0110 | 0 |
| 01 | 00 | 10 | 01 | 00 | 10 | 0111 | 0 |
| 01 | 01 | 00 | 01 | 01 | 00 | 1000 | 0 |
| 01 | 01 | 01 | 01 | 01 | 01 | 1001 | 0 |
| 01 | 01 | 10 | 01 | 01 | 10 | 1010 | 0 |
| 01 | 10 | 00 | 01 | 10 | 00 | 1011 | 0 |
| 01 | 10 | 01 | 01 | 10 | 01 | 1100 | 0 |
| 01 | 10 | 10 | 01 | 10 | 10 | 1101 | 0 |
| 10 | 00 | 00 | 01 | 00 | 00 | 0101 | 1 |
| 10 | 00 | 01 | 01 | 00 | 10 | 0111 | 1 |
| 10 | 00 | 10 | 01 | 00 | 01 | 0110 | 1 |
| 10 | 01 | 00 | 01 | 10 | 00 | 1011 | 1 |
| 10 | 01 | 01 | 01 | 10 | 10 | 1101 | 1 |
| 10 | 01 | 10 | 01 | 10 | 01 | 1100 | 1 |
| 10 | 10 | 00 | 01 | 01 | 10 | 1000 | 1 |
| 10 | 10 | 01 | 01 | 01 | 10 | 1010 | 1 |
| 10 | 10 | 10 | 01 | 01 | 01 | 1001 | 1 |

TABLE 1-continued

| Input | | | mapped to | | | index | rev |
|---|---|---|---|---|---|---|---|
| q1 | q2 | q3 | | | | | |
| 10 | 10 | 00 | 01 | 01 | 10 | 1000 | 1 |
| 10 | 10 | 01 | 01 | 01 | 10 | 1010 | 1 |
| 10 | 10 | 10 | 01 | 01 | 01 | 1001 | 1 |

Returning to FIG. 8, the context indexes from each of the gradient context quantizers 801 and 803 are fed into a multiplexer 805 for selecting which of the context indexes to be output from the context determination circuit 703. The multiplexer 805 is controlled by a comparator 807 which determines if the context index output from gradient context quantizer 801 is the "central" context. If so, then the index from the subquantizer 803 is selected. The comparator 807 also controls which of the reversed signals is output from context determination circuit 703. The two reversed signals are input into a multiplexer 809 which is controlled by the output of the comparator 807. Thus, the reversed signal output by the context determination circuit 703 corresponds to the selected context index. The index signal out of 703 consists of 5 bits: 4 bits from the selected index, and one bit to indicate which one was selected. The 5 bit index takes on one of 27 possible values.

Embedded Alphabet Extension

Figure 11:
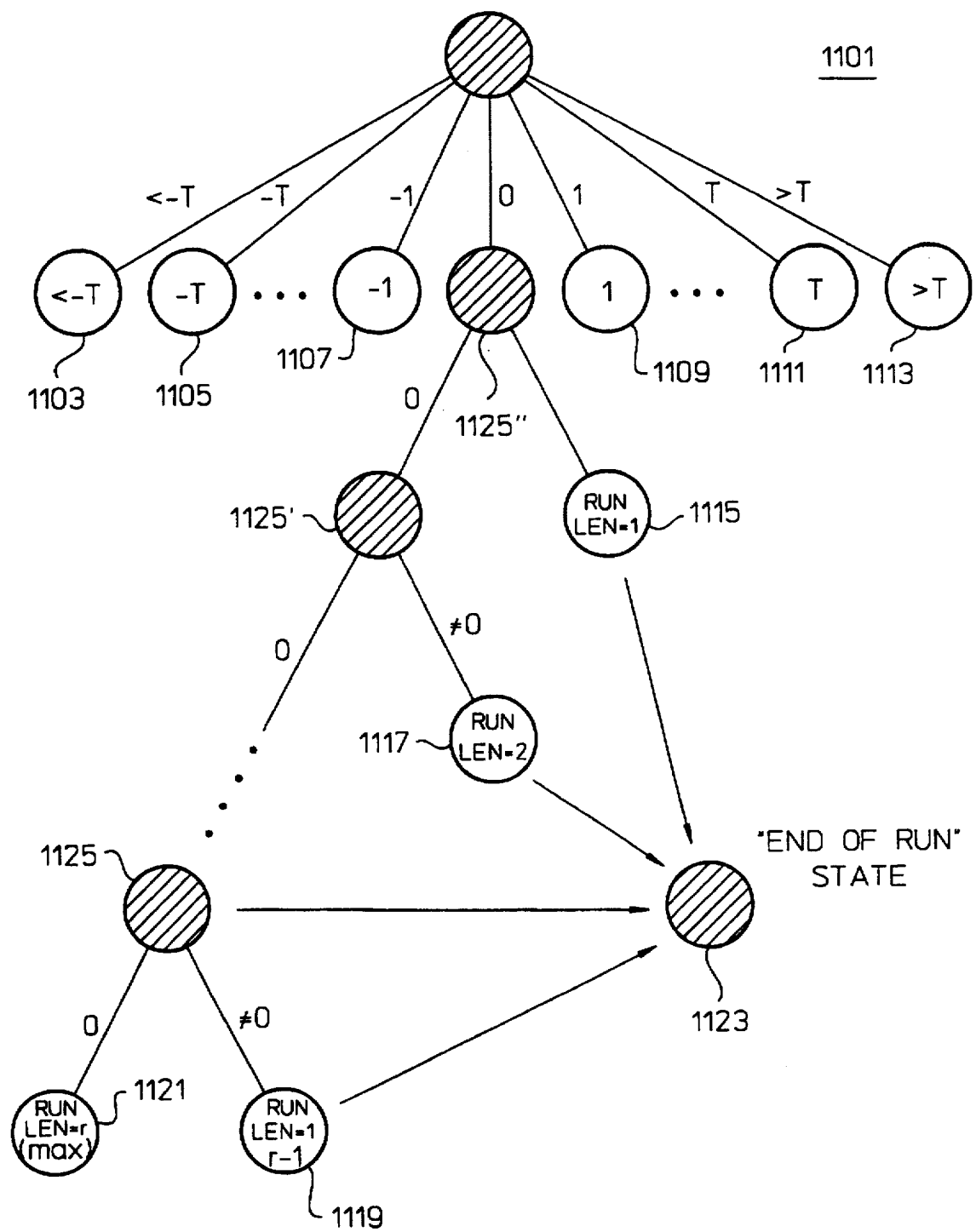
FIG. 11 is a binary tree of the image compressor according to the present invention used by the image compressor to codify "runs" of pixels having the same error value.

The image compressor 201 of the present invention addresses the redundancy of Huffman codes due to very skewed distributions, by embedding an alphabet extension into the context conditioning. Typically, very skewed distributions occur in the context where the absolute values of the three differences ($g_1$, $g_2$, $g_3$) are small, as this indicates a smooth region. Moreover, this context often occurs in runs, i.e., there exist connected regions in the image where every pixel occurs at the same (low-activity) context. This observation makes possible the implementation of an alphabet extension, by considering runs of 0-error values in the following manner. First, the "low-activity" context is split into two separate contexts, one for the case where a=b=c=d (i.e., all gradients are exactly zero) and one for the other cases. In general, if a very skewed distribution exists, after this split it will be mostly associated with the zero-gradient context. Thus, occurrences at the remaining context are encoded with the non-extended (reduced) alphabet and, for R=1, the number of contexts using this alphabet remains 27 (or 14, if the option of further partitioning the "central context" is not employed). For the zero-gradient context, the extended alphabet is represented with the tree 1101 shown in FIG. 11. Leaves 1103–1121 of the tree 1101 represent the events to be encoded. Notice that if $x_{i+1}$ occurs at this context, then, clearly, $\hat{x}_{i+1}$=a. If the prediction residual $e_{i+1}$ is non-zero, a leaf is reached and a single pixel is encoded. But if, as expected, a 0-error occurs (i.e., $x_{i+1}$=a), then the pixel East of d is considered. Clearly, if its value equals d, then $x_{i+2}$ also occurs at the zero-gradient context. In this case, we can search for longer runs by traversing the tree 1101; otherwise, a run-length of 1 is encoded. If the tree is traversed and $x_{i+2} \neq$d, the run is broken and a run length of 1 is encoded (a leaf was reached). The prediction residual $x_{i+2}$–d is then encoded at a new "end-of-run" state, for which the distribution does not include the event 0. This new state incorporates the information that $x_{i+2}$ is not d, which otherwise would be lost and the code would be redundant. If, again, as expected, $x_{i+2}$=d, then the tree indicates that the run-length is at least two, and the process continues until one of the following contingencies occurs:

a. A pre-determined maximal run length r is reached (the default value in our current implementation is r=6). The r consecutive 0-error values are encoded as a single event, and the next pixel is either encoded at one of the 27 (or 14) ordinary contexts, or starts a new run. This is indicated by leaf 1121.

b. The run is broken by a non-zero error value,
   e.g., leading to leaf nodes 1115, 1117, or 1119. The accumulated run is encoded as a single event and the pixel that breaks the run is then encoded at the "end-of-run" state 1123.

c. The next NE pixel breaks the run of zero-gradient contexts. The accumulated run is encoded as a single event and the next pixel is encoded at an ordinary context.

The alphabet extension procedure contains a certain amount of redundancy. That is due to the fact that the information needed to determine whether a run will be broken due to contingency c., is already available to the decoder at the beginning of the run. Thus, the decoder is able to predetermine that longer runs cannot occur and does not need to reserve coding space for these events. This redundancy can be easily removed as discussed below.

In a preferred embodiment, the maximal run length reflects experimental results, which indicate that for most images r=6 produces an acceptable reduction in the redundancy of the Huffman code at the zero-gradient context. This is also the case for images with long runs, which are frequent for example in digital radiology.

To summarize, the proposed alphabet extension, which is embedded into the context model, requires two additional distributions: one for the zero-gradient run-context and one for an end-of-run state. The alphabet size for the former is 2T+r+2, while for the latter it is 2T+2. With the default parameters T=8 and r=6, these require 24 and 18-entry Huffman tables, respectively.

Huffman coding

Above is described a procedure under which the image compressor 201 in compressing a pixel, or a string of pixels, yields one or more of the following encoding actions (numbers of events are computed using the default parameters for A=256:

a. An event out of 19 is encoded at one of 27 (or 14) possible contexts (small prediction error at ordinary context).

b. An event out of 57 is encoded (big prediction error).

c. An event out of 24 is encoded (a possibly aborted run at the zero-gradient context).

d. An event out of 18 is encoded (end of run state).

Thus, the present image compressor 201 manages 27 (or 14) 19-entry Huffman tables, as well as single 57-entry, 22-entry, and 18-entry Huffman tables. These tables are stored in the table array memory 711. In a preferred embodiment, the image compressor 201 operates in two passes: one for collecting the statistics from which optimal Huffman codes are built, and a second one for encoding the data through table look-up. The codes must be transmitted to the decoder, which then proceeds sequentially, in one pass. One-pass encoding alternatives are described below. Because the total number of events to which Huffman codes are associated can be up to 612 in a 27-context version, special attention must be given to whether a Huffman code should be completely described, and how. This issue is especially important in small images, for which excessive table overhead may offset the savings obtained through context conditioning. Therefore, in one embodiment, image compressor 201 compares the compression achieved using various combinations of tables, such that table-overhead can be minimized. In some cases, the compressor 205 might decide not to send a table, and revert to default tables known to both the compressor and decompressor, or to send a slightly mismatched table with a shorter description. In both cases, the slight loss in encoding length is offset by gains in table overhead. All the table information is available to the encoder at the end of the first pass, before encoding.

Efficient Code Description

A Huffman code is completly specified by describing its associated binary tree and the correspondence between symbols (or events) and leaves of the tree. A complete binary tree having L leaves, $L \geq 2$, can be described with 2L-4 bits. A straightforward way to construct such a tree consists in constructing a binary sequence by visiting the L-1 internal nodes sequentially, starting at the root and traversing each level of the tree in lexicographic order. Each node is assigned two bits, one per child. A "0" denotes that the associated child is a leaf, while a "1" corresponds to a child that is an internal node. The two bits corresponding to the last visited internal node are ignored, as they are always both "0." Next, the leaves of the tree are mapped to the symbols of the alphabet, which constitutes the expensive part of the code description. Having collected the statistics and computed optimal Huffman codes, the image compressor 201 takes into consideration three coding alternatives for the 2T+3 possible events at each ordinary context:

a. It assumes that for every non-negative integer t $$\text{Prob}\{e_{i+1}=t|C_i\} \geq \text{Prob}\{e_{i+1}=t+1|C_i\} \quad (8)$$

and $$\text{Prob}\{e_{i+1}=-t-1|C_i\} \geq \text{Prob}\{e_{i+1}=t+1|C_i\} \quad (9)$$

Under the constraints (8) and (9), a ranking of the error probabilities by decreasing values needs only 2T bits to be described, provided that the position of the "$e_{i+1} > T$" and "$e_{i+1} < -T$," events in the ranking is specified, which takes another $\lceil \log(2T+3) \rceil$ bits. Thus, by adding the Huffman tree description (2T+2 bits), the code can be specified with a total of $6T+2\lceil \log(2T+3) \rceil +2$ bits (namely, 60 bits with T=8). Of course, if (8) or (9) do not apply to the statistics collected in the first pass, the resulting code is not matched and the code length will not be optimal. However, in most cases these constraints either do apply or are slightly violated for some value of t close to T. In under-populated contexts, the resulting excess code length is usually smaller than the savings resulting from an incomplete code description.

b. No assumptions are made, and the code is fully described by appending to the tree representation a listing of the 2T+3 events, ranked by decreasing frequencies. For simplicity, a full byte is used for each event. An additional one bit specifies whether the code description is partial (i.e., the assumptions of a. above are used) or full.

c. A fixed table, known to both the encoder and the decoder, is used. This alternative saves table overhead for contexts that occur only a small number of times. For example, for T=8, a possible code can assign code words of length 3 to the events 0,1, and −1, code words of length 4 to the events 2,−2,3, and −3, and code words of length 5 to the other events. The tables are preceded by one bit per context, specifying whether fixed or customized (i.e., as in alternatives a. or b.) tables are used.

The image compressor 201 uses a similar procedure for the distribution at the end-of-run state. For the run state (zero-gradient context) and for the single distribution corresponding to values of $e_{i+1}$ larger than T, only the last two alternatives are considered (with different fixed codes). At the end of the first pass, the encoder decides for the alternative that results in the shortest code length, and the decoder is informed of the codes to be used in the second pass.

The method of operation of the image compressor of the present invention

The sequential steps image compressor 201 follows, in its two-pass form, are described below. For simplicity, we omit special cases such as the treatment of the boundaries of the image. Thus, we assume that the surrounding pixel values a, b, c, and d are well-defined for the processed pixel $x_{i+1}$. For example, it can be assumed that all pixels outside the image boundaries are zero. For illustrative purposes, the context quantization assumes R=1.

This method may be carried out on a general purpose computer having, e.g., a central processor, a random access memory, a read-only memory, a number of input/output devices, a video memory. This computer may be connected to other computers via a network such as a local-area network (LAN), a wide-area network, or via a communications links such as telephone or cable-television networks. Alternatively, the method may be carried out on a special purpose device such as a medical imaging system. In either application the method may either be software instructions loaded into the systems memory and executed by the central processing unit, may be implemented using the hardware embodiments described above, or may be stored in a read-only memory as firmware.

Method:

Step 0. Define a first alphabet reduction threshold T, a second alphabet reduction threshold B, a maximal run length r, and a context quantization threshold S. The defaults for these parameters in a preferred embodiment are 8, 64, 6, and 7, respectively. Specify whether recursive subdivision of the "central context" is desired (27-context option, as opposed to the basic 14 contexts). Allocate occurrence counts for 2T+3 events at each context, for B−T+1 events in the single distribution of large error values, for 2T+2+r events at the run state, and for 2T+2 events at the end-of-run state. Transmit to the decoder one bit indicating whether the default parameters are used. If some non-default parameter is selected, transmit the values of the parameters. Use another bit to indicate either 27 or 14 contexts.

Step 1. Having processed the pixel sequence $x^i$, start processing for the next pixel $x_{i+1}$. At the end of the image, go to Step 14. Given the values a, b, c, and d of the surrounding neighbors, compute the corresponding differences d−a and c−b (a−c is already available after processing $x_i$).

Step 2. Predict $x_{i+1}$ as $\hat{x}_{i+1}$ according to (2), or (3) and (4).

Step 3. Read $x_{i+1}$ from the input and compute $e_{i+1}=(x_{i+1}-\hat{x}_{i+1})$ to log A bits.

Step 4. By comparing their values to a threshold S, map the context differences to the quantization regions −1, 0, and +1, thus obtaining a context triplet $C_i=[q_1,q_2,q_3]$. If the first non-zero component of the triplet is −1, change all the signs in the triplet and associate a negative sign to it. Otherwise, associate a positive sign.

Step 5. If the 27-context option is used (rather than 14) and $C_i$ is the "central context" [0,0,0], repeat Step 4 with the threshold parameter $\lfloor S/2 \rfloor$.

Step 6. If the negative sign is associated with $C_i$, then $e_{i+1} \leftarrow -e_{i+1}$.

Step 7. If a=b=c=d, take the encoder into the "run" state (Step 10). Otherwise, stay in the "ordinary context" mode (Step 8).

Step 8. In the ordinary context mode, if $|e_{i+1}| \leq T$ then increment the count corresponding to $e_{i+1}$ at context $C_i$, increment i, and return to Step 1. Otherwise, increment the count corresponding to either "large positive" or "large negative" error.

Step 9. If $|e_{i+1}| \leq B$, increment the corresponding count in the distribution for large errors. Otherwise, increment the count corresponding to $|e_{i+1}|B$. Increment i and return to Step 1.

Step 10. In the run state, if $e_{i+1} \neq 0$ proceed as in Steps (8) and (9). Use the counts corresponding to the run state and, if necessary, the distribution of large errors.

Step 11. Otherwise, if $e_{i+1}=0$ increment a run-count. If the value of the next NE pixel equals d, read $x_{i+2}$ and increment i. Otherwise, skip Step (12).

Step 12. Repeat Step (11) until the processed pixel is not d, or until the run-count reached the allowed maximum r.

Step 13. Increment the occurrence count corresponding to the total run length detected in the run state counter. If the last read pixel is not d, increment the corresponding count in the end-of-run state. If necessary, increment also a count in the distribution of large errors. Increment i and return to Step (1).

Step 14. Once the first pass is complete, compute the Huffman codes for all the distributions stored. For each code, compute the code lengths corresponding to the representations described above in the sections of "Huffman Coding" and "Efficient Code Description" and select the one that results in the shortest code length. Transmit to the decoder a header indicating, for each code, whether customized or fixed tables are used. For each customized code, transmit the description of the Huffman tree. For the ordinary contexts, transmit a bit indicating whether full or partial table description is used. Then, describe the frequency ranking.

Step 15. Perform the second pass similarly to the first one, but instead of incrementing occurrence counts, transmit the corresponding code word. If Step (9) is executed and $|e_{i+1}|>B$, transmit also a $\lceil \log A/2-B \rceil$-bit representation of $|e_{i+1}|-B-1$.

Figure 12:
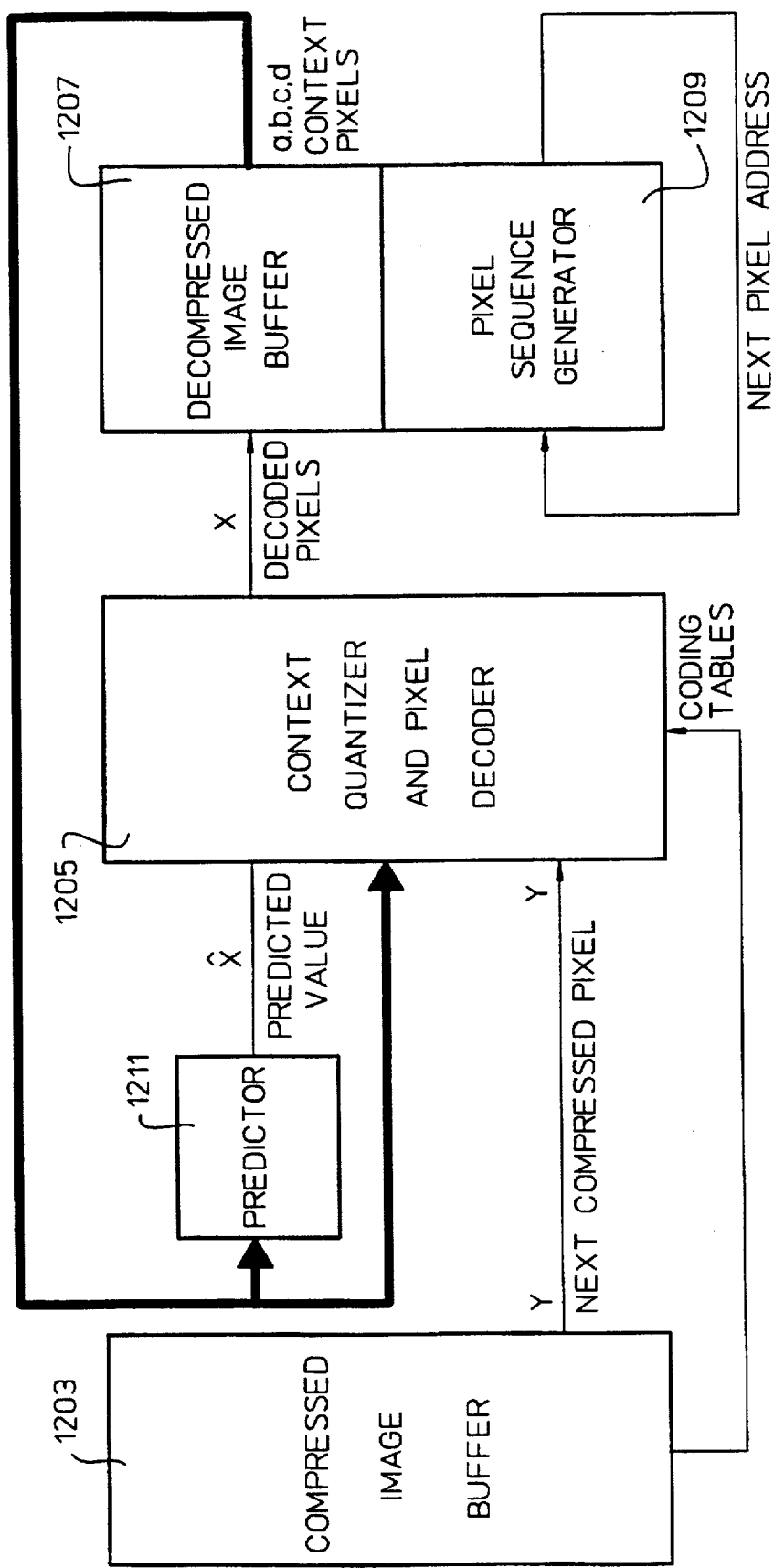
FIG. 12 is a block diagram of an image decoder according to the present invention and corresponding to the image compressor of FIG. 2.

FIG. 12 is a block diagram of an image decoder 1201 corresponding to the image compressor 201. The decoder 1201 accepts a compressed image from the image compressor 201 and stores this compressed image in a compressed-image buffer 1203. The Huffman coding tables used to compress the image are transmitted from the image buffer 1203 to a context quantizer and pixel decoder 1205. The tables are the Huffman tables generated by the image compressor 201. The context quantizer determines the context of the pixel to be decoded in the same manner as the image compressor 201. However, to obtain the context for the pixel, the image decompressor 1201 utilizes a previously decompressed sequence of pixels. Therefore, when a pixel has been decoded it is transmitted from the context quantizer and pixel decoder 1205 to a decompressed image buffer 1207. A pixel sequence generator 1209, connected to the decompressed image buffer, transmits the context pixels, a, b, c, and d (as defined above in the description of image compressor 201), to a predictor 1211. The predictor 1211 uses the same method as the predictor 207 of image compressor 201 to determine the predicted value, $\hat{x}_i$, which together with the context, a, b, c, and d, is fed into the context quantizer and pixel decoder 1205.

Figure 13:
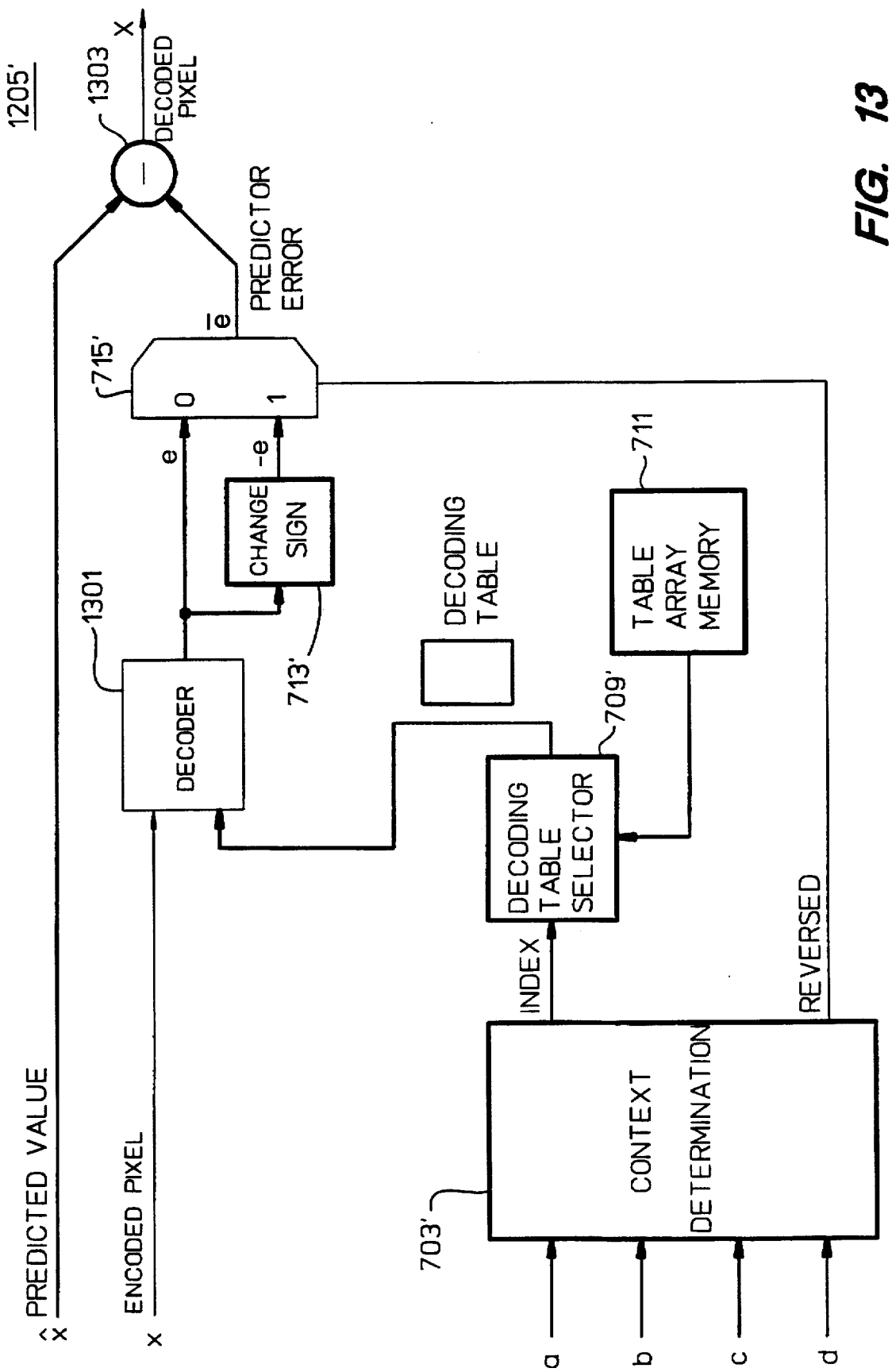
FIG. 13 is a block diagram of the context quantizer and pixel decoder of the image decoder of FIG. 12.

FIG. 13 is a block diagram of the context quantizer and pixel decoder 1205. The unit 1205 receives the context values a, b, c, and d from the pixel sequence generator 1209. These context values are fed into the context determination unit 703' which operates like unit 703 (described above in conjunction with FIGS. 7, 8, and 9). The context determination unit 703' outputs a context index and a reversed signal. The context index is input into the decoding table selector 709', which uses the index to fetch the appropriate Huffman table from the table array memory 711'. The table array memory 711' is similar to the table array memory 711, but because coding and decoding may occur on different machines, these memories are often not the same memory. Also, encoding and decoding tables carry the same information but may have different formats optimized for the operation at hand.

The decoding table selector 709' feeds the appropriate decoding table to the decoder 1301. The decoder 1301 also receives the encoded pixel value, y, and looks up the corresponding code in the decoding table. The sign of the value $\bar{e}$ is reversed by sign change unit 713' and both the value $\bar{e}$ and its negative are fed into and selected by a multiplexer 715' which is controlled by the reversed signal. The output from the multiplexer 715' e is added to the predicted value $\hat{x}_i$ by an adder 1303 to produce the decoded value $x_i$, which is fed into the decompressed image buffer 1207.

The context quantizer portion of unit 1205 operates according to the same method as the context quantizer of the image compressor system 201. Thus, the context quantizer determines which Huffman table to use to look-up the error corresponding to the compressed pixel value y. Having looked up the error value e, the pixel decoder 1205 adds that quantity to the predicted value $\hat{x}_i$.

The following decoding method assumes that the various Huffman codes are represented by their binary trees with labeled leaves. In one alternative suitable for faster decoding, the first action that the decoder takes is to translate the compact descriptions generated by the encoder into more easily accessible tables.

Decoding method

Step 0. Retrieve the parameters T, r, and S, and use the header information to build the Huffman trees.

Step 1. Having decoded the pixel sequence $x^i$, start decoding of the next code word. Given the values a, b, c, and d of the surrounding neighbors, compute the corresponding differences d–a and c–b (a–c is already available).

Step 2. Execute Steps 4, 5, and 7 of the image compression method described above to determine the context $C_i$, its sign, and the mode (run state (step 4) or ordinary context (step 3)).

Step 3. In the ordinary context mode, traverse the Huffman tree corresponding to $C_i$ following the encoded bit stream, until a leaf is reached. If the leaf indicates that $|e_{i+1}|>T$, further follow the encoded bit stream to traverse the Huffman tree corresponding to the distribution of large errors. If, again, the decoded code word indicates that $|e_{i+1}|>B$, read the next $\lceil \log(A/2-B) \rceil$ bits to compute the exact value of $e_{i+1}$. If the negative sign is associated with $C_i$, then change the sign of $e_{i+1}$. Finally, compute $\hat{x}_{i+1}$ according to (2) or (3) and (4) (depending on which predictor has been adopted) and output $x_{i+1}=e_{i+1}\hat{x}_{i+1}$. Increment i and return to Step 1.

Step 4. In the run state, traverse the Huffman tree corresponding to this state following the encoded bit stream, until a leaf is reached. If the leaf indicates a zero-length run, proceed as in Step 3. Otherwise, output as many pixel values d as indicated by the leaf and increment i accordingly. If the total run-length is r, or if the next NE pixel is not d, return to Step 1. Otherwise, further follow the encoded bit stream to traverse the Huffman tree corresponding to the end-of-run state, proceed as in Step 3 to obtain $e_{i+1}$, and output $x_{i+1}=e_{i+1}+d$. Increment i and return to Step 1.

Experimental Results

The present invention has been implemented in a system referred to below as $LOCO^2I$ (Low Complexity, Context-Based, Lossless Image Compression). Table 2 is a comparison of compression results achieved by $LOCO^2I$ and several other image compressors. The results reported below were achieved using the basic configuration of the present invention as discussed above in conjunction with FIGS. 1–11 for compression of a set of gray-scale images digitized at 8 bits per-pixel. This set includes standard images, as well as medical, satellite, and (mosaic) digital camera images. Preliminary results on RGB color images are discussed below in conjunction with a discussion of alternative embodiments to the basic configuration which improve performance with color images. Specifically, the set of test gray-scale images reported on in this section is composed of:

a. The 576 rows by 720 columns color test images from the JPEG standards committee, represented in the YUV system, with the chrominance components U and V subsampled to 576×360 and each component considered separately as a gray-scale image.

b. The 512×512 gray-scale standard images from the USC data set.

c. Medical (MRI, X-ray, and ultrasound) images. The MRI images (human brains and a sequence of head slices) have dimensions 256×256. The X-ray images tested (human bone and lung) are 1024×1024. The ultrasound images, in turn, are 480×512 renderings of human hearts.

d. A set of seven 480×640 images of the planet Neptune obtained by the Voyager spacecraft. In addition to the main image object the image files contain textual and graphic information near the edges.

TABLE 2

| Image | Diff. Context BT/CARP | $LOCO^2I$ | Sun-set | Lossless JPEG | 7-Pass JPEG | DPCM Entropy |
|---|---|---|---|---|---|---|
| barb2 Y | 4.56 | 4.84 | 4.81 | 5.26 | 5.26 | 5.44 |
| balloon V | 2.28 | 2.42 | 2.42 | 2.57 | 2.57 | 2.82 |
| girl U | 2.78 | 2.85 | 2.87 | 3.03 | 3.03 | 3.04 |
| hotel Y | 4.26 | 4.47 | 4.48 | 4.89 | 4.89 | 4.95 |
| hotel V | 3.25 | 3.35 | 3.37 | 3.59 | 3.59 | 3.59 |
| hotel U | 3.05 | 3.14 | 3.16 | 3.37 | 3.37 | 3.43 |
| lena | 4.15 | 4.33 | 4.21 | 4.65 | 4.65 | 4.61 |
| pyramid | 2.97 | 3.11 | 3.30 | 3.51 | 3.28(4) | 4.14 |
| couple | 2.25 | 2.48 | 2.56 | 2.74 | 2.42(4) | 3.58 |
| MRI brain | 4.35 | 4.62 | 4.51 | 4.9 | 4.9 | 4.96 |
| MRI head slice | 2.55 | 2.81 | 2.87 | 2.97 | 2.97 | 3.66 |
| lung X-ray | 2.09 | 2.37 | 2.25 | 2.41 | 2.37(4) | 3.11 |
| heart ultrasound | 3.04 | 3.27 | 3.31 | 3.52 | 3.30(4) | 4.17 |
| Neptune (Voyager) | 3.04 | 3.26 | 3.54 | 3.69 | 3.56(4) | 4.33 |

In Table 2, a representative subset of these images is considered. In Table 2, for each image considered the compression ratio (bits per pixel—lower numbers are better than higher numbers) is given for several image compression systems. The images listed in Table 2 are shown in Appendix A. This set of images coincides with those reported in Weinberger, et al., and provides a basis for comparison with a state-of-the-art version of the Sunset algorithm as described in G. G. Langdon, Jr. and M. Mareboyana, "Centering of context-dependent components of prediction error distributions," in *Proc. SPIE (Applications of Digital Image Processing XVI)*, vol. 2028, pp. 26–31. In addition, these results are compared with the JPEG independent lossless compression system (described in ISO/IEC 10918-1 ITU T.81. Digital compression and coding of continuous tone still images—Requirements and guidelines, September 1993). The results reported in Table 2 for the Sunset algorithm (which are taken from Weinberger et al.) correspond to computed ideal code lengths, i.e., negative logarithms of the probabilities assigned by the algorithm to the data. An additional overhead is expected after following the modeling step by an arithmetic Q-coder or QM-coder. In G. G. Langdon, Jr., A. Gulati, and E. Seiler, "On the JPEG model for lossless image compression," in *Proc. of the 1992 Data Compression Conference*, (Snowbird, Utah, U.S.A.), pp. 172–180, March 1992, the reported overhead (for an older version of the Sunset algorithm) averages 3.5% for the Q-coder and 2.5% for the QM-coder. As for lossless JPEG, the results reported in Table 2 used arithmetic coding with the default parameter values: predictor number 7, namely (a+b)/2, upper bucketing parameter equal to 1, and lower bucketing parameter equal to 0. As a reference, Table 2 also contains an additional column which covers the (quite unrealistic) situation where the best predictor for each specific image, out of the seven standard predictors proposed in JPEG, is selected. This scheme is referred to as "7-pass JPEG." The digit in parenthesis represents the optimizing predictor, in case it is not 7. The results obtained with DCXT-BT/CARP, the best of the universal context modeling options proposed in Weinberger et al., are also reported as a benchmark. On the other extreme, we give first-order (unconditioned) entropies of the prediction residuals after applying the default JPEG predictor (a+b)/2. This column is named "DPCM entropy." A comparison of the various algorithms on the complete sets (including images not reported in Table 2) yields similar results, and is summarized in Table 3. Excluding DCXT-BT/CARP from the comparison, Table 3 shows that the best compression ratios are obtained with LOCO$^2$I, despite being less complex than the arithmetic-coding-based algorithms.

TABLE 3

| Image | Diff. Context BT/CARP | LOCO$^2$I | Sunset | Lossless JPEG | 7-Pass JPEG | DPCM Entropy |
|---|---|---|---|---|---|---|
| JPEG (27 images) | 3.41 | 3.55 | 3.55 | 3.82 | 3.81 | 3.90 |
| USC (26 images) | 4.22 | 4.34 | 4.39 | 4.7 | 4.6 | 4.86 |
| Medical (49 images) | 2.36 | 2.61 | 2.65 | 2.72 | 2.7 | 3.38 |
| Space (3 images) | 2.91 | 3.14 | 3.41 | 3.47 | 3.43 | 4.23 |

LOCO$^2$I has also been applied to two mosaic images, captured with a Kodak digital camera. Each image was compressed as 4 independent gray-scale images (two shifted Green planes, one Red plane, and one Blue plane). The first image, a portrait, compressed down to 4.57 bits/pixel with LOCO$^2$I versus 5.02 bits/pixel with lossless JPEG. The second image, a picture of an office cubicle at Hewlett-Packard Laboratories, yielded 4.52 bits/pixel for LOCO$^2$I versus 4.81 bits/pixel for lossless JPEG. Despite the correlation reduction caused by the sub-sampling process (a single image is compressed as 4 separate ones), the results obtained with LOCO$^2$I are better than a 5:1 lossy JPEG compression, which requires an interpolation step with significant distortion. The reason is that the lossy JPEG algorithm is applied to complete color planes, so that the image to be compressed is formed by 24-bit pixels in total after interpolation. Thus, a 5:1 compression would reduce the total size only to 4.8 bits/pixel.

Alternative embodiments

There are many possible variations of the present invention, some of which are mentioned in this section. Some of these depend on specific target applications and on that application's particular complexity/compression constraints.

In some cases, the edge detecting capabilities should be adapted to the specific complexity constraints. For example, predictors that use knowledge of the NE pixel value provide better edge detection, as is the case with the predictor of (3). However, the crucial modeling step is performed by the context modeler, and the impact of better predictors may be limited and not merit the additional complexity. The quantization of the context, in turn, may be affected by specific applications. For example, for some medical images the optimal value of the threshold S is smaller than the default S=7 used in the description above of the image compressor 201.

As for the embedded alphabet extension, it is possible to remove the redundancy (mentioned above in the section entitled "Embedded Alphabet Extension") caused by the allocation of coding space which is known a priori to be useless. An alternative embodiment of image compressor 201 eliminates this redundancy by first examining the maximum possible length of the run, which can be shorter than the maximum allowed run-length r. A shorter length may be due to either a broken run of NE pixels or a boundary, both of which can be also detected by the decoder. The encoder 707 uses a different code for each possible value of this maximum length, between 2 and r. The alphabet extension tree for each code covers only achievable runs, thus removing the redundancy. Clearly, the decompressor 1201 can keep track of the code used by the encoder 707 without any side information. A single end-of-run distribution is shared by the r−1 different codes. Another possible alternative embodiment processes runs of other very frequent contexts, not necessarily the zero-gradient one (e.g., contexts satisfying that |a−c|, |b−c|, and |a−d| are at most 1).

Another alternative embodiment provides for one-pass coding in applications where two passes cannot be afforded. In such an embodiment, a first approximation consists of designing fixed Huffman tables which are made available also to the decoder. This is possible in applications where homogeneous data with specific characteristics is expected, e.g., MRI medical images. A fixed-table version of the present invention maintains adaptivity, because the context modeling classifies the pixels into classes which are encoded with different tables. Although this is a 0-parameter code, in the sense that no parameters are learned and transmitted to the decoder, the number of contexts still plays a "model cost" role, since it determines the amount of training data needed to tailor fixed tables. Another alternative is the use of Rice-Golomb codes (as described in R. F. Rice, Some practical universal noiseless coding techniques. Technical Report JPL-79-22, Jet Propulsion Laboratory, Pasadena, Calif., March 1979) instead of Huffman codes. Finally, as complexity permits, the present invention can be adaptively encoded with an arithmetic code in one-pass, producing compression results at least as good as (and likely better than) the two-pass version.

Additionally, the system and method of the present invention, as described above in conjunction with FIGS. 2–12, is adaptable to the compression of color images. How the present invention is used in conjunction with color images depends on the color space in which the image is represented. The YUV-type of representation is generally assumed to produce fairly uncorrelated images, which, consequently, can be independently compressed as gray-scale images. On the other hand, the RGB representation in some cases presents a strong correlation between its components. Hence, although the image compression method of the present invention may be applied to separate planes, in other RGB-alternatives the prediction and modeling templates account for inter-plane correlation. In one embodiment the Green plane (which contains most of the luminance information) is compressed as a gray-scale image, and then using its pixel values to model the other two planes.

Predictors for the Red and Blue planes, based on both intra-plane correlation and correlation with the Green plane, used by a compressor for color images according to the present invention, to be followed by the method of the gray-scale version of the image compressor 201 predicts the Blue and Red planes by $$\bar{x}_{i+1} = \frac{a+b}{2} + x^{(G)}_{i+1} - \frac{a^{(G)} + b^{(G)}}{2} \quad (10)$$

where the superscript (G) denotes the corresponding value in the Green plane. Thus, a predictor operating according to (10) can be interpreted as correcting the value that would be picked by the predictor number 7 of JPEG, with the error made by this predictor in the Green plane. The accumulated savings in the three color planes (24-bit pixels) with respect to lossless JPEG are 2.61 bits/pixel for "girl" and 3.75 bits/pixel for "barbara."

Table 4 shows results obtained with RGB representations of two images from the JPEG set by compressing the Green plane with an image compressor 205 using a predictor 207 operating according to (10) ("LOCO²I with interplane predictor") compared to LOCO²I operating according to (2) ("Plain LOCO²I") and Lossless JPEG:

TABLE 4

| Image | Plain LOCO²I | LOCO²I with inter-plane predictor | Lossless JPEG |
| --- | --- | --- | --- |
| girl R | 4.36 | 3.49 | 4.69 |
| G | 4.04 | 4.04 | 4.34 |
| B | 4.24 | 3.44 | 4.55 |
| barb R | 5.13 | 3.66 | 5.43 |
| G | 4.93 | 4.93 | 5.22 |
| B | 5.17 | 3.77 | 5.46 |

The system and method of the present invention is further adaptable to conform to near-lossless compression as defined by the ISO/IEC/SC29/WG1 committee. The near-lossless standard requires that there is a uniform bound e (e.g., 1, 2, 3, 7) on the difference between each original pixel and its decoded version.

Figure 14:
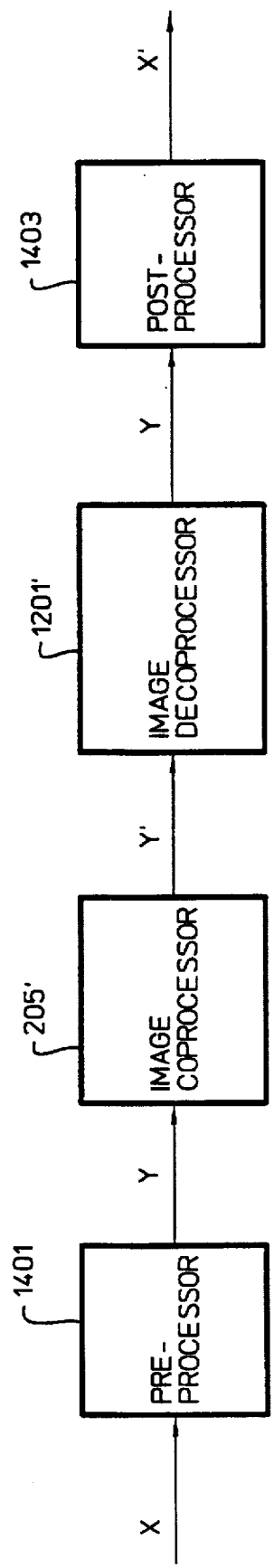
FIG. 14 is a block diagram showing the configuration of a near-lossless image compressor/decompressor system of the present invention.

FIG. 14 is a block diagram showing the configuration of an image compressor/decompressor system having a pre-processor 1401 prior to an image compressor 205'. The image compressor 205' is of the same design and operates like the image compressor 205. The preprocessor introduces the allowed error. Thus, the error is transparent to the image compressor 205', which operates in a lossless scheme.

The pre-processor 1401 is a scalar quantization that maps each pixel value into one of approximately A/(2e+1) values, thus reducing the size of the input alphabet A. More specifically, according to one embodiment each pixel value in the original image is mapped into $$y_i = \lfloor \frac{x_i}{2e+1} \rfloor \quad (11)$$

Subsequent to the mapping of all pixels, $x_i$, in the image to corresponding values $y_i$ the image compressor 205' compresses the image y according to the procedure described for image compressor 205 into compressed image y'.

The corresponding decompressor 1201' is of similar design and operates according to the same method as image decompressor 1201, described above in conjunction with FIG. 12. The decompressor 1201' losslessly decompresses y' into image y according to the procedure described above for image decompressor 1201.

The image decompressor 1201' is followed by a post-processor 1403. The post-processor 1303 is a scalar dequantizer and performs a reconstruction mapping according to $$x' = y(2e+1) + e \quad (12)$$

The absolute value |x−x'| of the reconstruction error is upper-bounded by e, because x' is the positive integer closest to x and congruent to e mod (2e+1). With (12) large values of y might be mapped to values x' greater than A−1, in which case x' is truncated to A−1.

In another near-lossless embodiment of the present invention, the pre-processor 1401 maps each pixel value $x_i$ into $$y_i = \lfloor \frac{x_i + e}{2e+1} \rfloor \quad (13)$$

In this alternative, the corresponding reconstruction mapping performed by the post-processor 1403 according to $$x'_i = y_i(2e+1). \quad (14)$$

In this embodiment, $x'_i$ is the positive integer closest to x and congruent to 0 mod (2e+1). In the event of an "overflow" the post-processor 1403 truncates excessive values to A−1.

Figure 15:
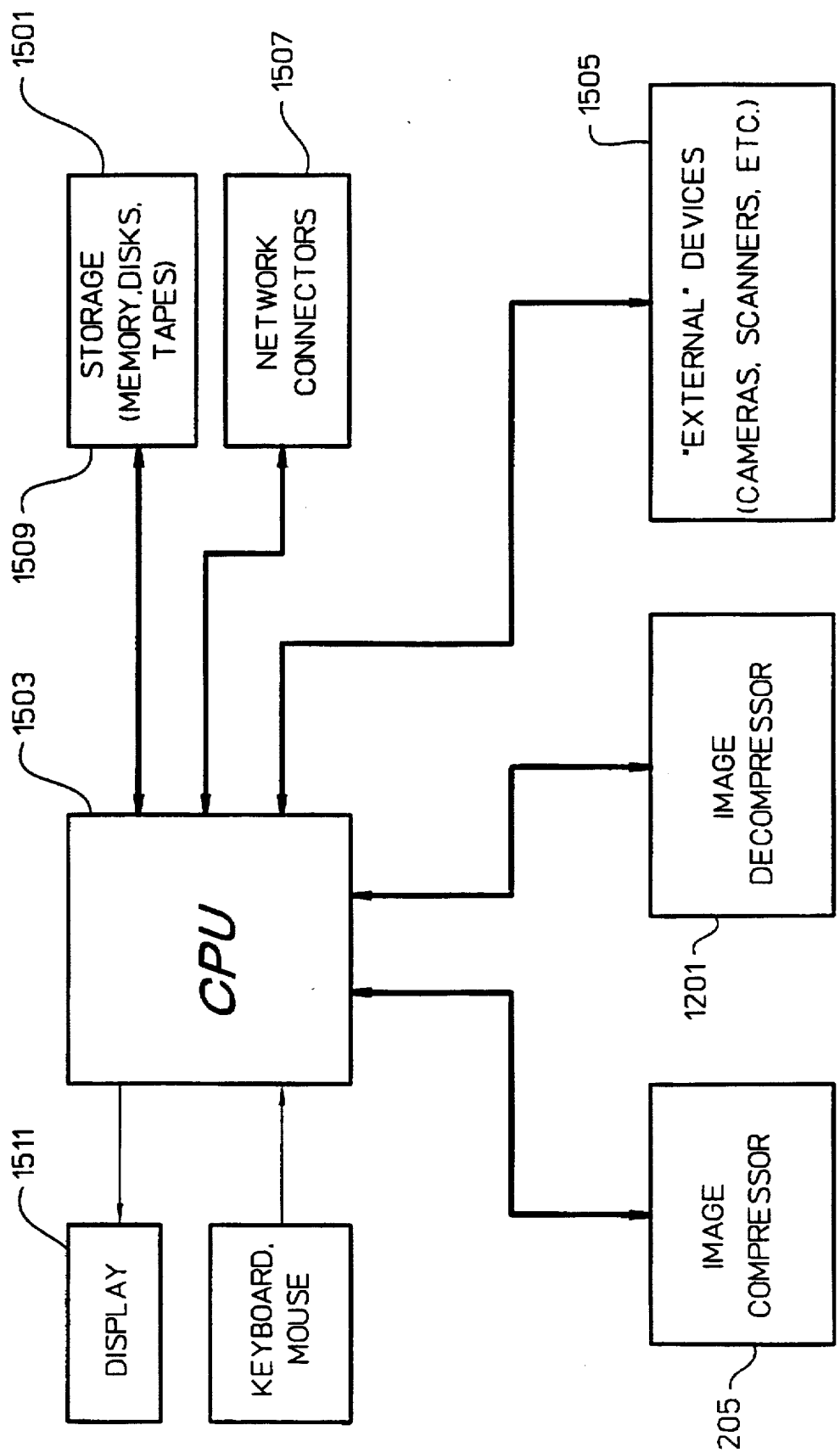
FIG. 15 is a block diagram of a computer system having an image compressor and an image decompressor according to the present invention.

FIG. 15 is a block diagram of a computer system 1501 incorporating the image compressor 205 and image decompressor 1201. The computer system 1501 has a central processing unit 1503 connected to one or more image sources 1505. The image sources 1505 may include devices such as digital cameras and scanners. The computer system 1501 may also be connected to computer networks, such as local area networks, the Internet, or online services, via network connections 1507 (e.g., via direct connections to networks or via modem). The CPU 1503 transmits images from the image sources 1505 to the image compressor 205 which compresses the image according to the method described above.

The CPU 1503 is further connected to storage devices 1509, e.g., memories (both for storage of images and other data), disk drives, and tape units. Subsequent to the compression of the images, the CPU 1503 may transmit images to these storage devices 1509. Alternatively, the CPU 1503 may direct the images to the network connections 1507.

The computer system 1501 may also decompress compressed images for display. The CPU may, for example, obtain a compressed image via the network connection 1507. The CPU 1503 directs such compressed images to the image decompressor 1201 which decompresses the image according to the method described above for image decompression. The CPU 1503 is further connected to a display 1511, e.g., a cathode-ray tube or flat-panel display. The CPU 1503 directs decompressed images for display on the display 1511.

In one embodiment, the image compressor 205 and the image decompressor 1201 is implemented as computer instructions operable to direct the operations of the CPU 1503. In such a case the image compressor 205 and image decompressor 1201 are stored in one of the storage devices 1509 and are executed by the CPU 1503 to compress and decompress images according to the methods of the present invention.

In an alternative embodiment the image processor 205 and image decompresor 1201 are special purpose hardware devices, e.g., image processing accelerators, attached to the CPU 1503 as auxilliary devices.

In certain applications, a computer system 1501 may need only be able to decompress images and not to compress images, and vice versa. In such cases either the compressor 205 or decompressor 1201 may be absent from the computer system 1501.

As a person skilled in the art will realize that numerous modifications and changes may be made to the present invention, it is not desired to limit the invention to the exact construction and operation as illustrated and described. Hence, all suitable modifications and equivalents may be resorted to as falling within the scope of the invention.

We claim:

1. A method of predicting the value of a pixel in a digitized image comprising the steps of:

determining a context of said pixel wherein said context comprises a first pixel located north of said pixel and having a value a, a second pixel located west of said pixel and having a value b, a third pixel located north-west of said pixel and having a value c, and a fourth pixel located north-east of said pixel and having a value d; and determining a predicted value $\tilde{x}_{i+1}$ for said pixel according to:

$$\tilde{x}_{i+1} \equiv \begin{cases} \max(a', b) & \text{if } a+b-c \geq \max(a', b) \\ \min(a', b) & \text{if } a+b-c \leq \min(a', b) \\ a+b-c & \text{otherwise} \end{cases}$$

where, $$a' \equiv \begin{cases} (a+d)/2 & \text{if } |a-d| < 4|a-c| \wedge \text{sign}(a-d) - \text{sign}(c-a) \\ a & \text{otherwise.} \end{cases}$$

2. A method of operating a computer to losslessly compress digitized images comprising the steps of:

a. retrieving an image to compress from an input device; and b. encoding a pixel in the image by:

b.1 directing said computer to use a template of pixels adjacent to the pixel in said image to determine a predicted value for the pixel;

b.2 comparing the predicted value and the actual value, thereby producing a residual;

b.3 determining a context of the pixel from values of gradients between pixels adjacent to said pixel and quantizing the gradients; and b.4 retrieving a code corresponding to the residual from a context-specific Huffman table.

3. The method of claim 2, further comprising the step of:

c. transmitting the codes to a decoder.

4. The method of claim 2 wherein said computer determines said context-specific Huffman tables by for each context determining the distribution of error values and using said distribution for said each context to build said context-specific Huffman table.

5. The method of claim 2 wherein the step of determining said context further comprises quantizing said gradients into approximately equiprobable regions.

6. The method of claim 5 wherein said quantizing step comprises the steps of for each gradient determining within which of a predetermined number of regions said gradient is.

7. The method of claim 2 wherein each context-specific Huffman table contains codes corresponding to each member of an alphabet of encodable events, and wherein for at least one context the alphabet of encodable events is extended to include events that are not prediction residuals.

8. The method of claim 2 wherein said context-specific Huffman tables are static and wherein said computer encodes said image and said decoder decodes said image using said static context-specific Huffman tables.

9. The method of claim 2 wherein each quantized context corresponds to a context vector of quantized gradients, further comprising the steps of:

for each non-zero context vector, creating a context pair having a first member corresponding to said non-zero context and a second member corresponding to the negative of said non-zero context; and for each pixel occurring in the first member of a context pair, encoding the negative of the residual.

10. The method of claim 2 further comprising the steps of:

further subdividing at least one of said quantized contexts into a plurality of sub-quantized contexts;

for each pixel occurring in one of said at least one of said subdivided quantized contexts, determining a particular sub-quantized context of said sub-divided quantized context wherein said pixel occurs in said particular sub-quantized context; and retrieving a code corresponding to said residual from a context-specific Huffman table corresponding to said particular sub-quantized context.

11. The method of claim 9 wherein said at least one of said quantized context is a quantized context corresponding to quantized gradients of zero.

12. The method of claim 2 further comprising the steps of:

for each quantized context, building a context specific Huffman table corresponding to said quantized context.

13. The method of claim 12 wherein said step of building quantized context specific Huffman tables includes the step of excluding codes for particular residual values; and further comprising the steps of:

building a non-context specific Huffman table containing codes for said particular residual values; and for each residual value for which a context-specific Huffman table does not contain a code, retrieving a code from said non-context specific Huffman table for said particular residual values.

14. The method of claim 13 further comprising the step of: transmitting the code to a decoder;

for each residual value for which a context-specific Huffman table does not contain a code, transmitting a special value to the decoder indicating that the code for said residual value was retrieved from said non-context specific Huffman table.

15. The method of claim 13 wherein said particular residual values are infrequently occurring residual values.

16. The method of claim 13 wherein said particular residual values are large residual values.

17. The method of claim 2 wherein said context of said pixel comprises a first pixel located north of said pixel and having a value a, a second pixel located west of said pixel and having a value b, a third pixel located north-west of said pixel and having a value c, and a fourth pixel located north-east of said pixel and having a value d, and said step b of determining a predicted value $\tilde{x}_{i+1}$ according to:

$$\tilde{x}_{i+1} \equiv \begin{cases} \max(a', b) & \text{if } a+b-c \geq \max(a', b) \\ \min(a', b) & \text{if } a+b-c \leq \min(a', b) \\ a+b-c & \text{otherwise} \end{cases}$$

where, $$a' \equiv \begin{cases} (a+d)/2 & \text{if } |a-d| < 4|a-c| \wedge \text{sign}(a-d) = \text{sign}(c-a) \\ a & \text{otherwise.} \end{cases}$$

18. The method of claim 2 wherein said codes retrieved from said context-specific Huffman tables are Golomb-Rice codes.

19. The method of operating a computer to compress digitized images of claim 2 further comprising the steps of:
   c. building a Huffman table for each quantized context;
   d. transmitting said quantized context specific Huffman tables to a decoder;
   e. retrieving a code corresponding to at least one of said residuals from a context-specific Huffman table; and
   f. transmitting said code to a decoder.

20. The method of claim 19 wherein said step f of transmitting said context specific Huffman tables further comprises the steps of:
   transmitting a first indicator indicating whether fixed Huffman tables should be used for decoding or whether Huffman tables are transmitted to said decoder; and
   if said first indicator indicates that Huffman tables are transmitted:
      for each said Huffman table:
         transmitting a description of a binary tree for said Huffman table;
         transmitting a second indicator of whether the residual values in said Huffman table follows a presumed order; and
         if such Huffman table follows said presumed order, for each pair of residual values consisting of a positive residual and the negative of said positive residual, transmitting an indicator of whether the positive residual is more probable than the negative of said positive residual; and
         if such Huffman table does not follow said presumed order, transmitting a sequence of symbols.

21. The method of claim 20 further comprising the steps of:
   (a) determining which alternative selected from transmitting Huffman tables and using fixed Huffman tables results in a more efficient compression of said image;
   setting said first indicator according to said determining step (a); and
   if sending Huffman tables is more efficient:
      (b) determining which alternative selected from using a presumed sequence order and sending the sequence order results in a more efficient compression of said image; and
      setting said second indicator according to said determining step (b).

22. The method of claim 20 wherein said context-specific Huffman tables do not include codes for infrequently occurring symbols, and further comprising the steps of:
   generating non-context specific Huffman tables for said infreqently occurring symbols;
   for such infrequently occurring symbols, transmitting an escape code indicative of such a non-context specific Huffman table is used for retrieving a code corresponding to said infrequently occurring symbol; and
   for each context specific Huffman table, transmitting a location for said escape code in a sequence of symbols used in constructing said Huffman table.

23. The method of claim 19 wherein each pixel value is a member of a first alphabet of values, further comprising the step of:
   mapping each pixel value of said image to a value in a second alphabet, wherein said second alphabet is a subset of said first alphabet; and
   mapping each decoded pixel value in said second alphabet to a value in a third alphabet.

24. The method of claim 23 wherein said mapping introduces an error of uniform bound e and each pixel value $x_i$ is mapped to a value $y_i$ according to a relationship:

$$\lfloor y_i = \frac{x_i}{2e+1} \rfloor,$$

and each decoded pixel value $y_i$ is mapped to a value $x'_i$ according to the relationship:

$$x'_i = y(2e+1)+e.$$

25. The method of claim 23 wherein said mapping introduces an error of uniform bound e and each pixel value $x_i$ is mapped to a value $y_i$ according to a relationship:

$$\lfloor y_i = \frac{x_i+e}{2e+1} \rfloor,$$

and
each decoded pixel value $y_i$ is mapped to a value $x'_i$ according to the relationship:

$$x'_i = y_i(2e+1).$$

26. An image compression encoder wherein for each pixel in an image there is a context based on the pixels that have been encoded prior to said each pixel, having an encoder comprising:
   a. an image buffer containing at least one digitized image;
   b. a pixel and context generator connected to said image buffer and operable to retrieve a value of a pixel in said image buffer and a context of said pixel;
   c. a predictor connected to said context generator and operable to predict the value of said pixel based on said context;
   d. a subtractor connected to said pixel and to said predictor and operable to subtract said pixel value from a corresponding predicted value, thereby obtaining an error value for said pixel;
   e. a table-memory for storing a plurality of context-specific Huffman tables; and
   f. a code generator connected to said pixel and context generator and to said context-specific Huffman tables and operable to retrieve a code based on said context, said pixel value, and said context-specific Huffman table corresponding to said context;
   wherein said error value is used by said code generator to retrieve said code from said context-specific Huffman table.

27. The image compression encoder of claim 26 further comprising a context quantizer connected to said context and operable to quantize the context of a pixel, wherein said code generator uses said quantized context to select a context-specific Huffman table from which to retrieve said code.

28. The image compression encoder of claim 27 wherein said quantized context determinator determines gradients in said context and determines in which of several regions said gradients fall.

29. The image compression encoder of claim 28 wherein said context consists of a pixels to the west, northwest, north, and northeast of said pixel, and said image buffer is operable to selectively output values corresponding to said context pixels, and said quantized context determinator comprises:

a. a first subtractor connected to input said west and northwest pixel outputs, and operable to output a first difference, whereby said subtractor outputs a first gradient;

b. a second subtractor connected to input said northwest and north pixel outputs, and operable to output a second difference, whereby said subtractor outputs a second gradient;

c. a third subtractor connected to input said northeast and north pixel outputs, and operable to output a third difference, whereby said subtractor outputs a third gradient;

d. a first, a second, and a third quantizer, each having an input connected to said gradient outputs of said first, second, and third subtractor, respectively, wherein each contains a first comparator connected to said input gradient and to a threshold value and a second comparator connected to said input gradient and the negative of said threshold value, whereby said quantizer outputs a quantized gradient, and where said three quantized gradients form a quantized context.

30. The image compression encoder of claim 29 wherein for each gradient region represented by a positive range has a corresponding negative range and wherein said quantized context determinator further comprises a mapping table for mapping each context having a quantized gradient indicative of a negative range to a corresponding context with the same gradient having a positive range.

31. The method of claim 30 wherein said alphabet extensions encodes a length of consecutive constant prediction residuals.

32. The method of claim 31 wherein the context of a pixel is computed from at least one gradient between two adjacent pixels, and comprising the further step of:

for each pixel where all said at least one gradient are zero, encoding the number of consecutive such pixels.

33. The method of claim 31 wherein a pixel follows said length of consecutive constant prediction residuals and comprising the further step of:

for the first pixel following said length of consecutive constant prediction residuals, retrieving a code for the residual for said first pixel following said length of consecutive constant prediction residuals from a non-context specific Huffman table that does not include said constant prediction residual.

34. The image compression encoder/decoder system of claim 6 further comprising:

at least one context-specific Huffman table having an alphabet of encodable events extended to include events that are not prediction residuals.

35. The image compression encoder/decoder system of claim 34 wherein said alphabet extension is a length of consecutive constant prediction residuals.

36. The image compression encoder/decoder system of claim 34 wherein for each pixel the context of said pixel is determined from at least one quantized gradient between at least two neighboring pixels;

for all contexts for which all said quantized gradients are zero, said context-specific Huffman table for the number of consecutive such pixels.

37. The image compression encoded decoder system of claim 6 wherein said Huffman tables are static.

38. The image compression encode/decoder system of claim 27 wherein said context-quantizer produces a first index, further comprising:

a context sub-quantizer connected to said context and operable to quantize the context of a pixel at a finer resolution than said quantizer and to produce a second index; and a multiplexer connected to said context quantizer and to said context sub-quantizer operable to select one of said first and second indexes.

39. The image compression encode/decoder system of claim 26 wherein said table memory contains a plurality of context specific Huffman tables that do not contain codes for particular residual values, and wherein said table memory is further operable to store a non-context specific Huffman table containing codes for said particular residual values.

40. The image compression encode/decoder system of claim 39 wherein said particular residual values are infrequently occurring residual values.

41. The image compression encode/decoder system of claim 39 wherein said particular residual values are large residual values.

42. The image compression encode/decoder system of claim 26 further comprising:

a coding table generator connected to said table memory and operable to generate said context-specific Huffman tables.

43. The image compression encode/decoder system of claim 42 wherein said coding table generator is operable to generate Golomb-Rice codes.

44. The image compression encode/decoder system of claim 26 wherein each pixel has a value in a first alphabet and further comprising:

a preprocessor for mapping each pixel value in said image into a value in a second alphabet, wherein said second alphabet is a subset of said first alphabet.

45. The image compression encode/decoder system of claim 43 wherein said preprocessor introduces an error of uniform bound e and each pixel value $x_i$ is mapped to a value $y_i$ according to the relationship:

$$y_i = \lfloor \frac{x_i}{2e+1} \rfloor;$$

and each decoded pixel value $y_i$ is mapped to a value $x'_i$ according to the relationship:

$$x'_i = y(2e+1) + e.$$

46. The image compression encode/decoder system of claim 43 wherein said preprocessor introduces an error of uniform bound e and each pixel value $x_i$ is mapped to a value $y_i$ according to the relationship:

$$y_i = \lfloor \frac{x_i + e}{2e+1} \rfloor;$$

and each decoded pixel value $y_i$ is mapped to a value $x'_i$ according to the relationship:

$$x'_i = y(2e+1).$$

* * * * *